W. O. SARGENT.
SOAP WRAPPING MACHINE.
APPLICATION FILED DEC. 27, 1912.
1,099,398.
Patented June 9, 1914.
20 SHEETS—SHEET 2.
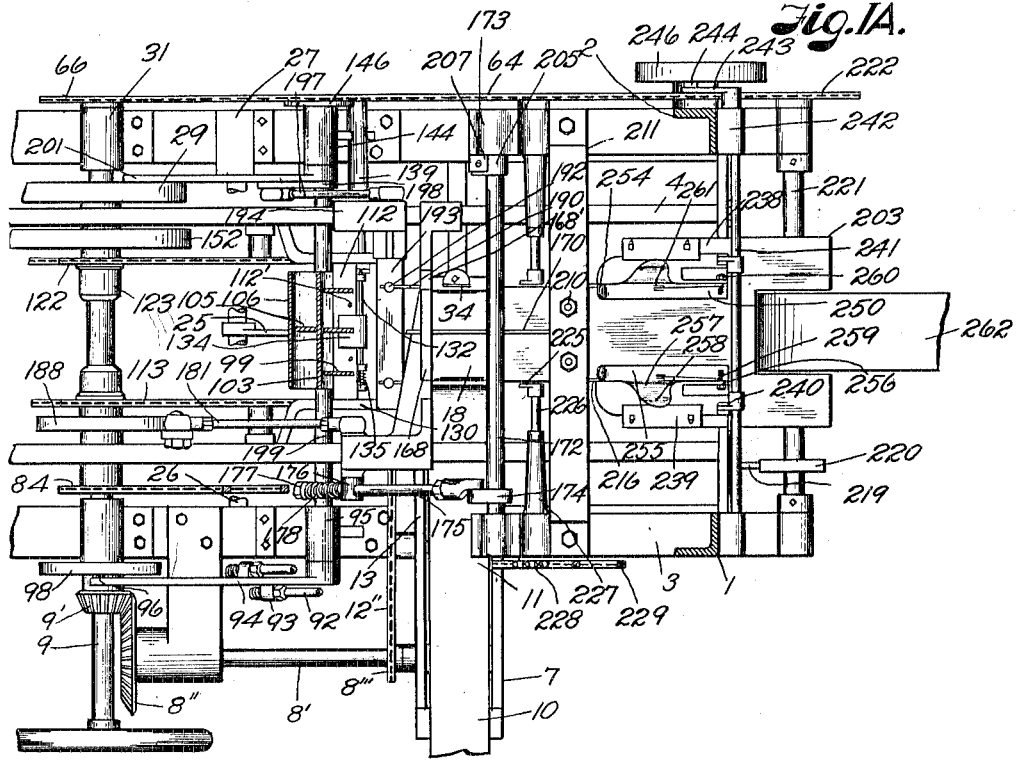
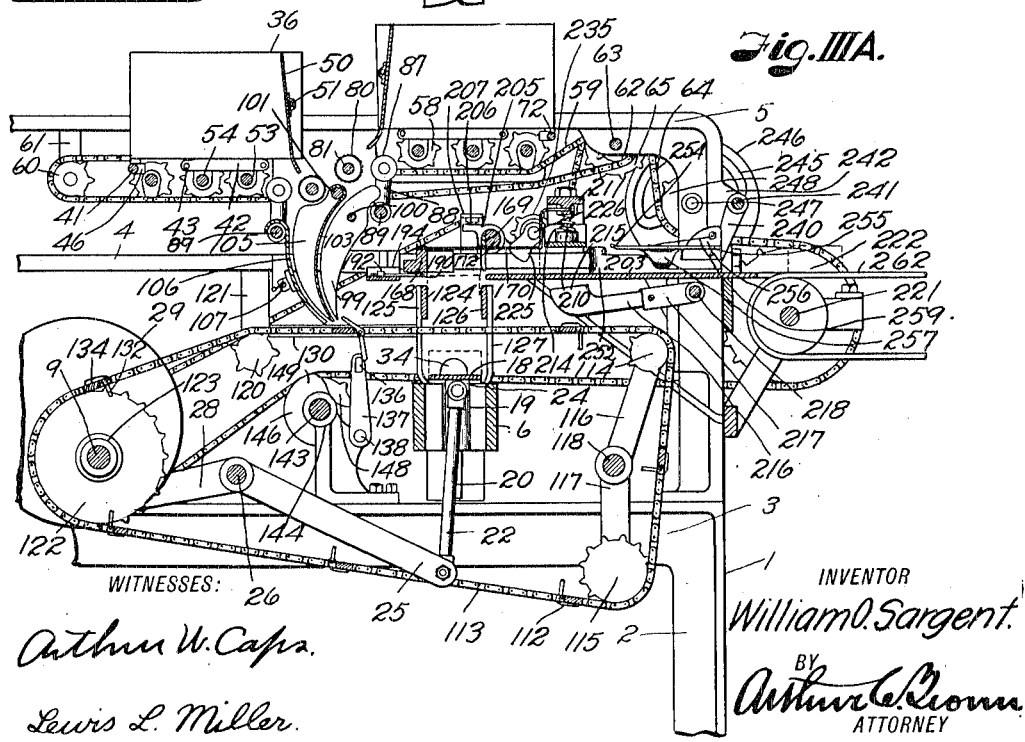
WITNESSES:
Arthur W. Capp.
Lewis L. Miller.
INVENTOR
William O. Sargent.
BY
Arthur C. Brown
ATTORNEY W. O. SARGENT.
SOAP WRAPPING MACHINE.
APPLICATION FILED DEC. 27, 1912.
1,099,398.
Patented June 9, 1914.
20 SHEETS—SHEET 3.
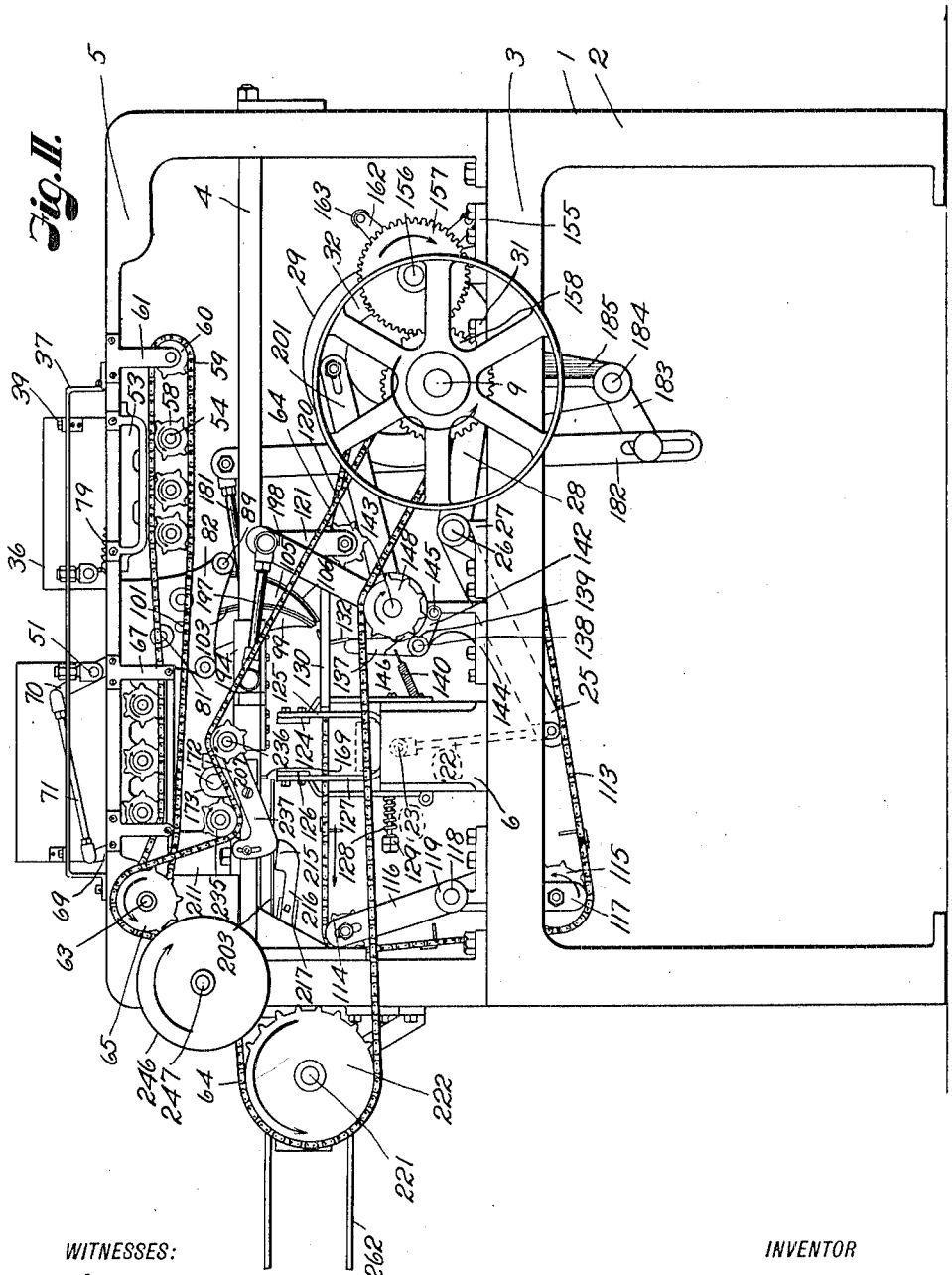
WITNESSES:
Arthur W. Capps.
Lewis L. Miller.
INVENTOR
William O. Sargent.
BY
Arthur C. Brown
ATTORNEY

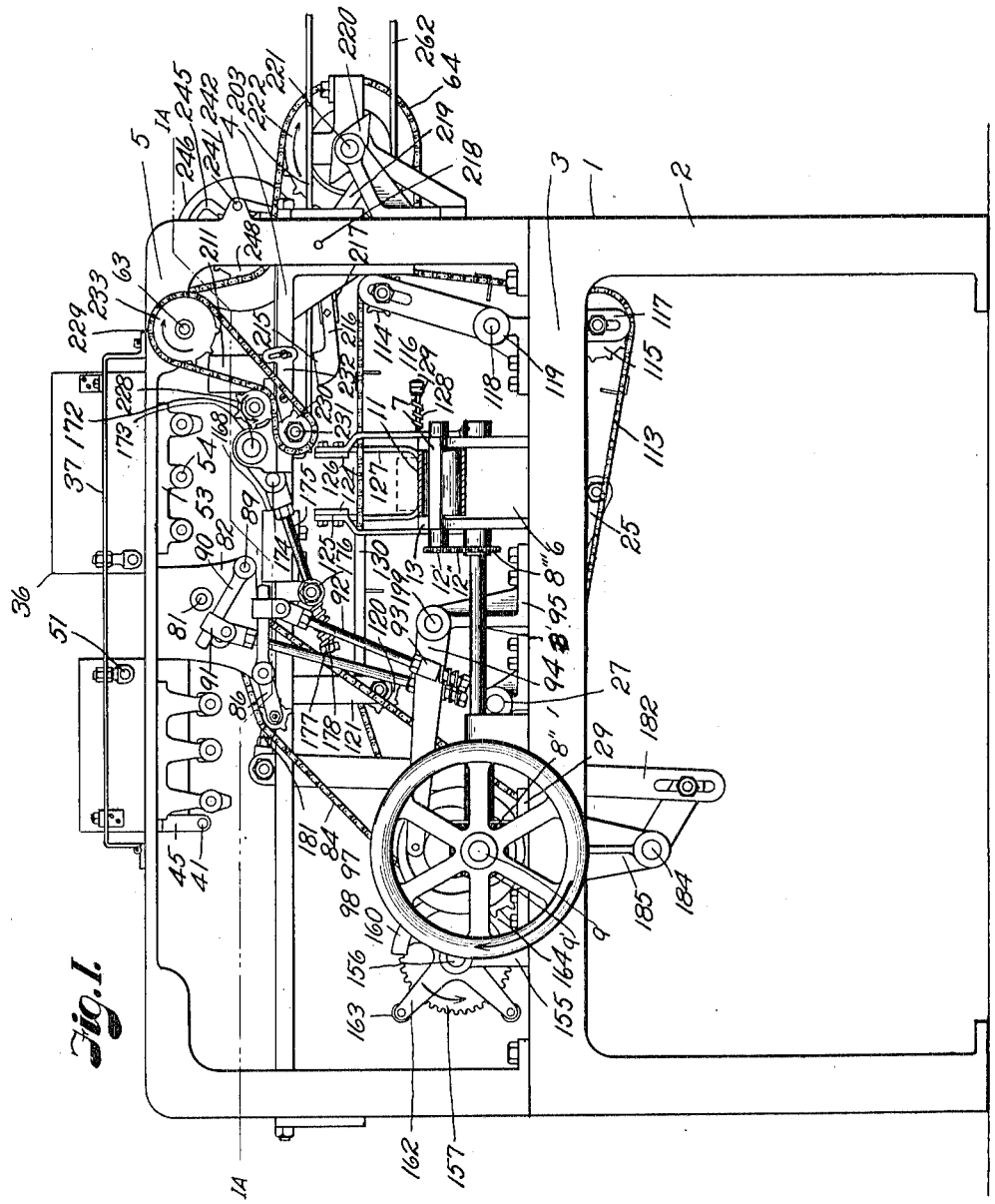

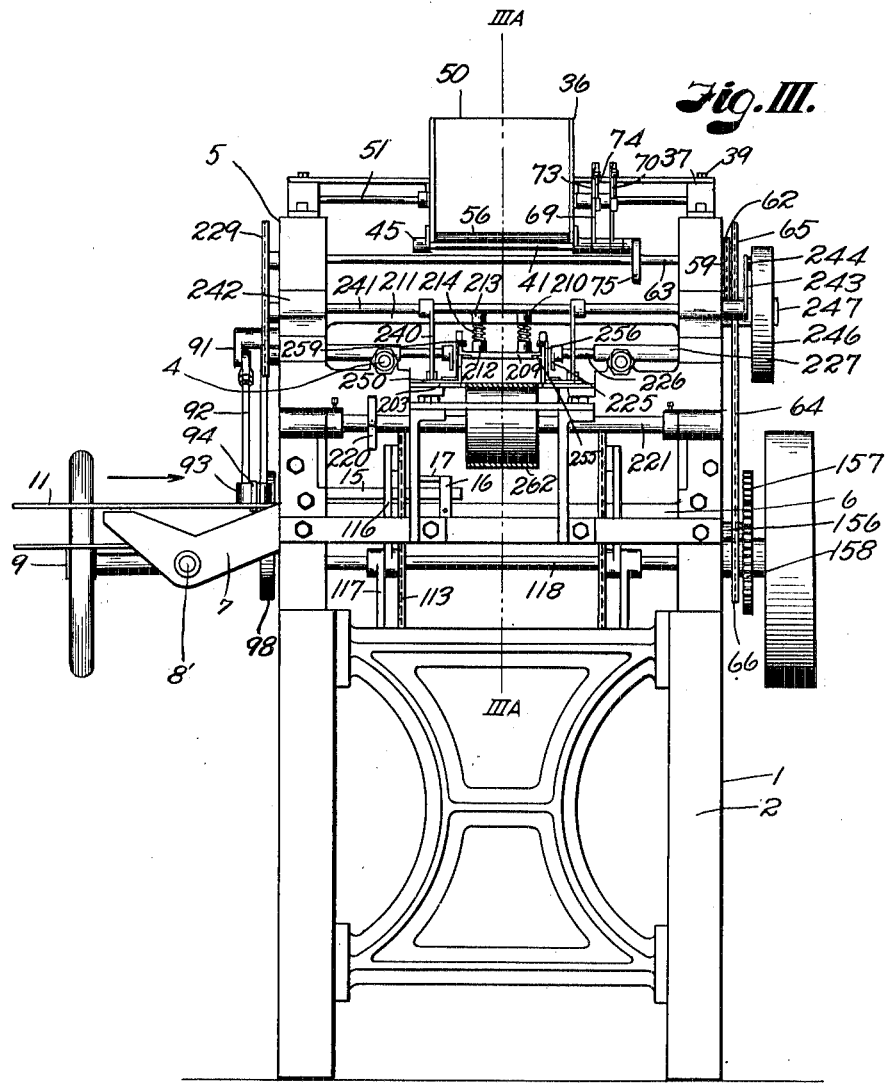

W. O. SARGENT.
SOAP WRAPPING MACHINE.
APPLICATION FILED DEC. 27, 1912.
1,099,398.
Patented June 9, 1914.
20 SHEETS—SHEET 5.
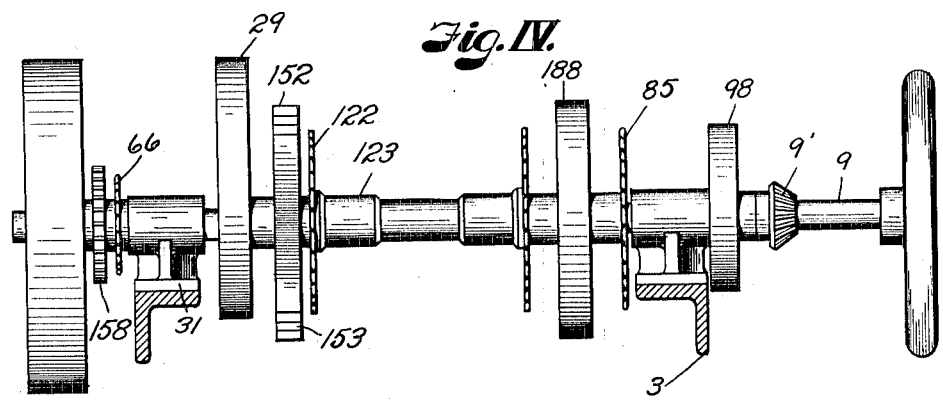
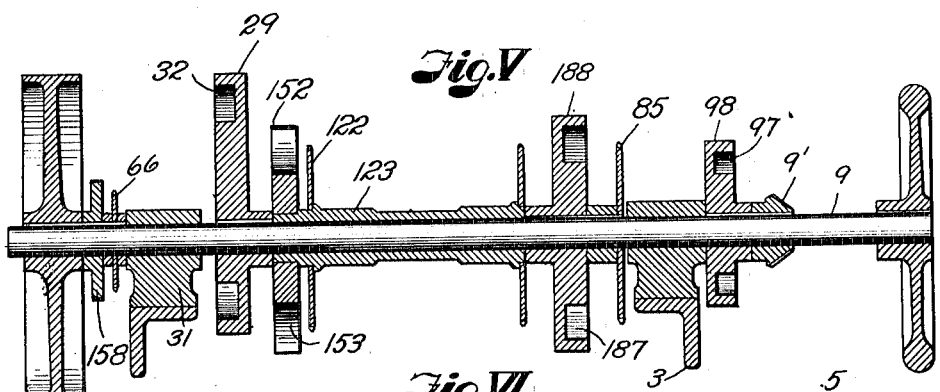
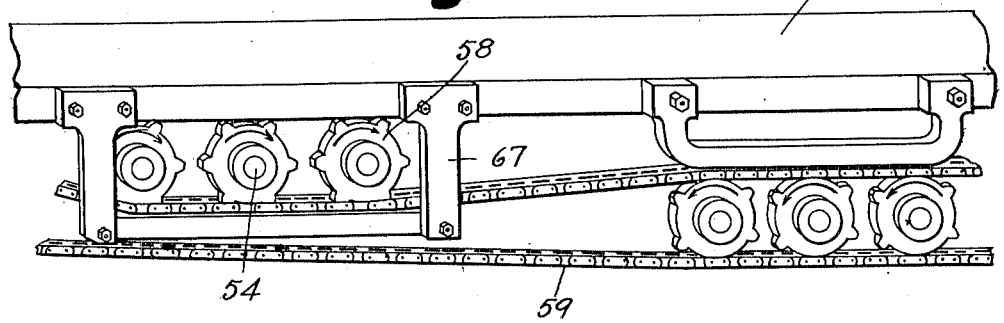
WITNESSES:
Arthur W. Capps.
Lewis L. Miller.
INVENTOR
William O. Sargent.
BY
Arthur C. Brown
ATTORNEY

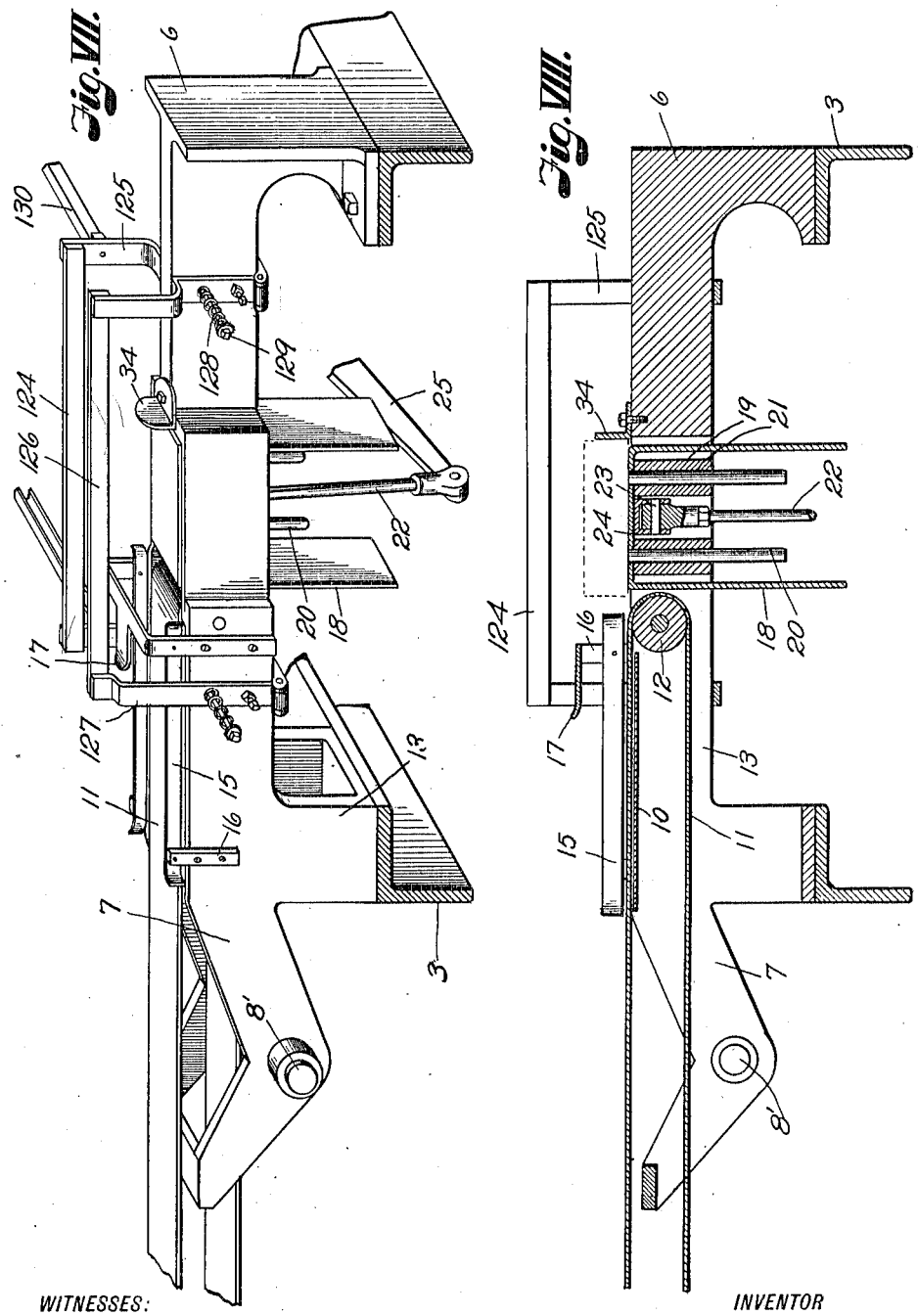

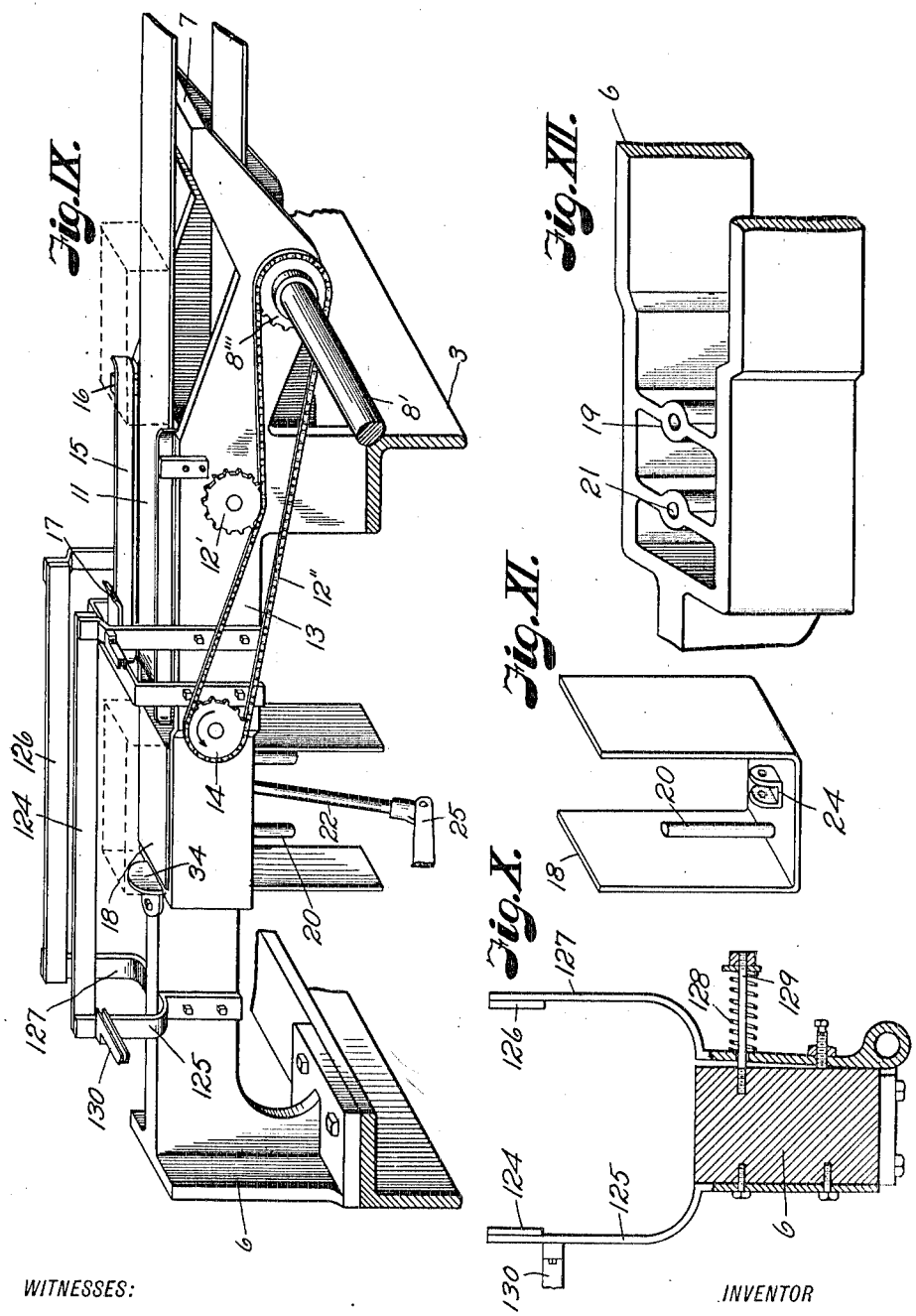

W. O. SARGENT.
SOAP WRAPPING MACHINE.
APPLICATION FILED DEC. 27, 1912.
1,099,398.
Patented June 9, 1914.
20 SHEETS—SHEET 8.
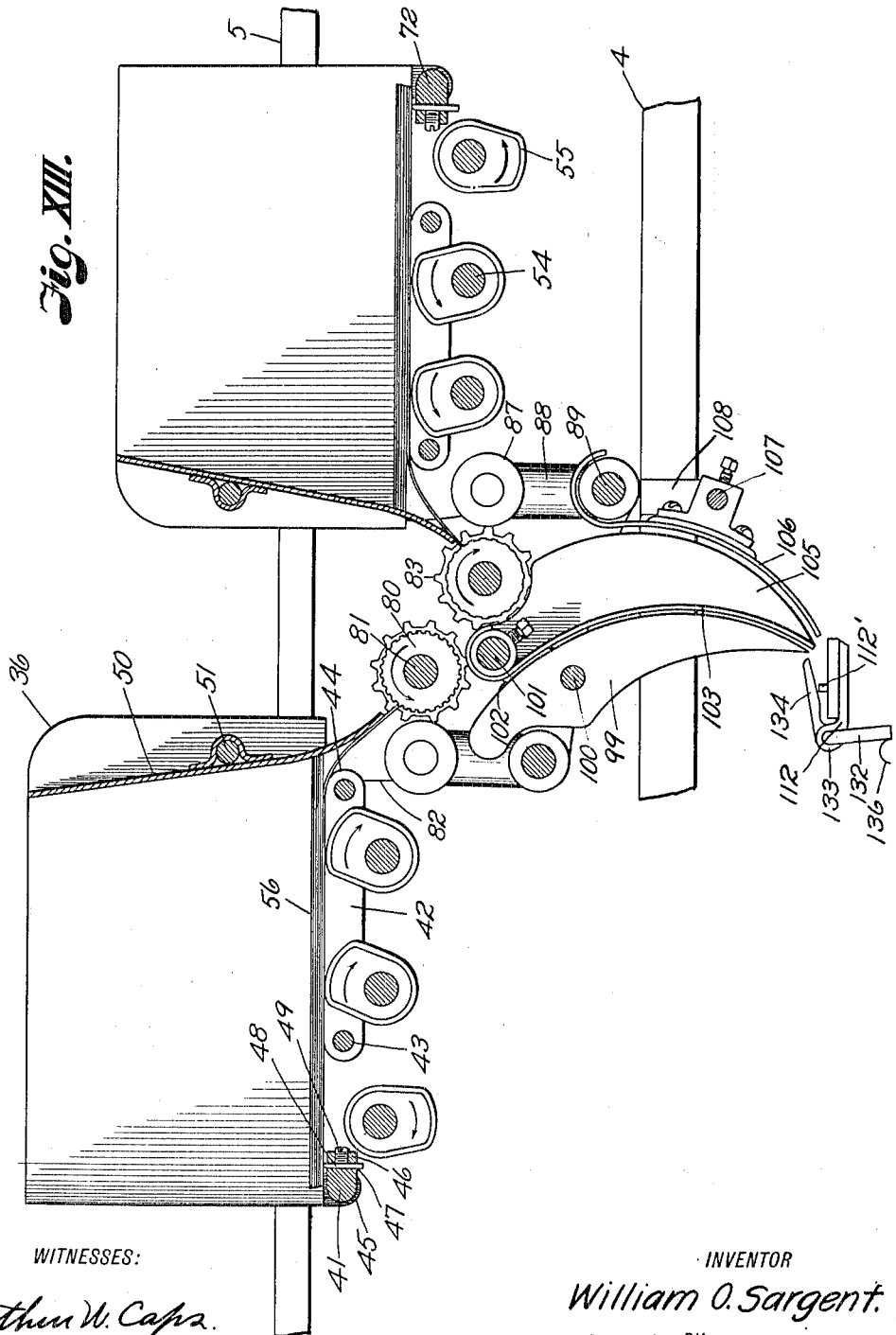
WITNESSES:
Arthur W. Capps.
Lewis L. Miller.
INVENTOR
William O. Sargent.
BY
Arthur C. Brown
ATTORNEY

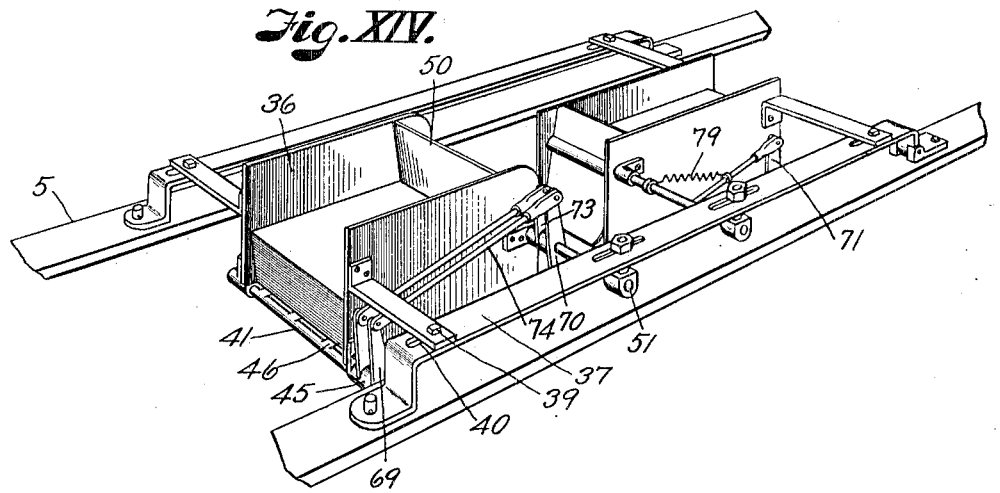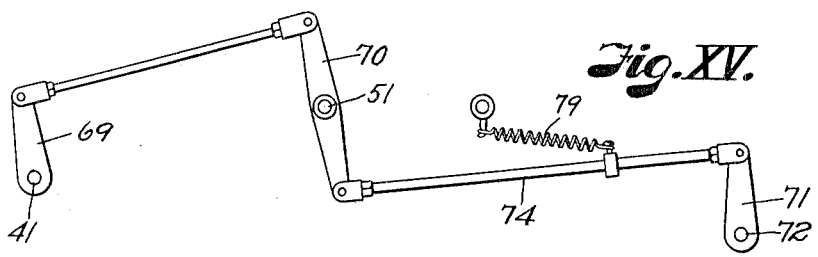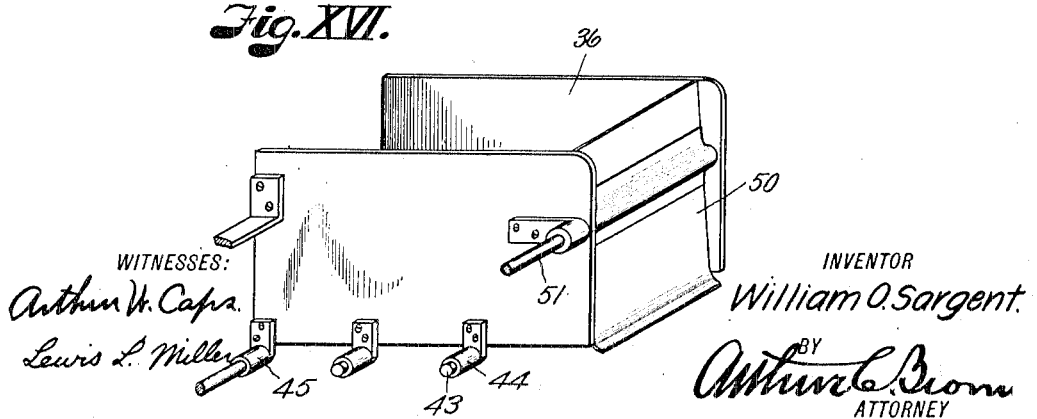

W. O. SARGENT.
SOAP WRAPPING MACHINE.
APPLICATION FILED DEC. 27, 1912.
1,099,398.
Patented June 9, 1914.
20 SHEETS—SHEET 10.
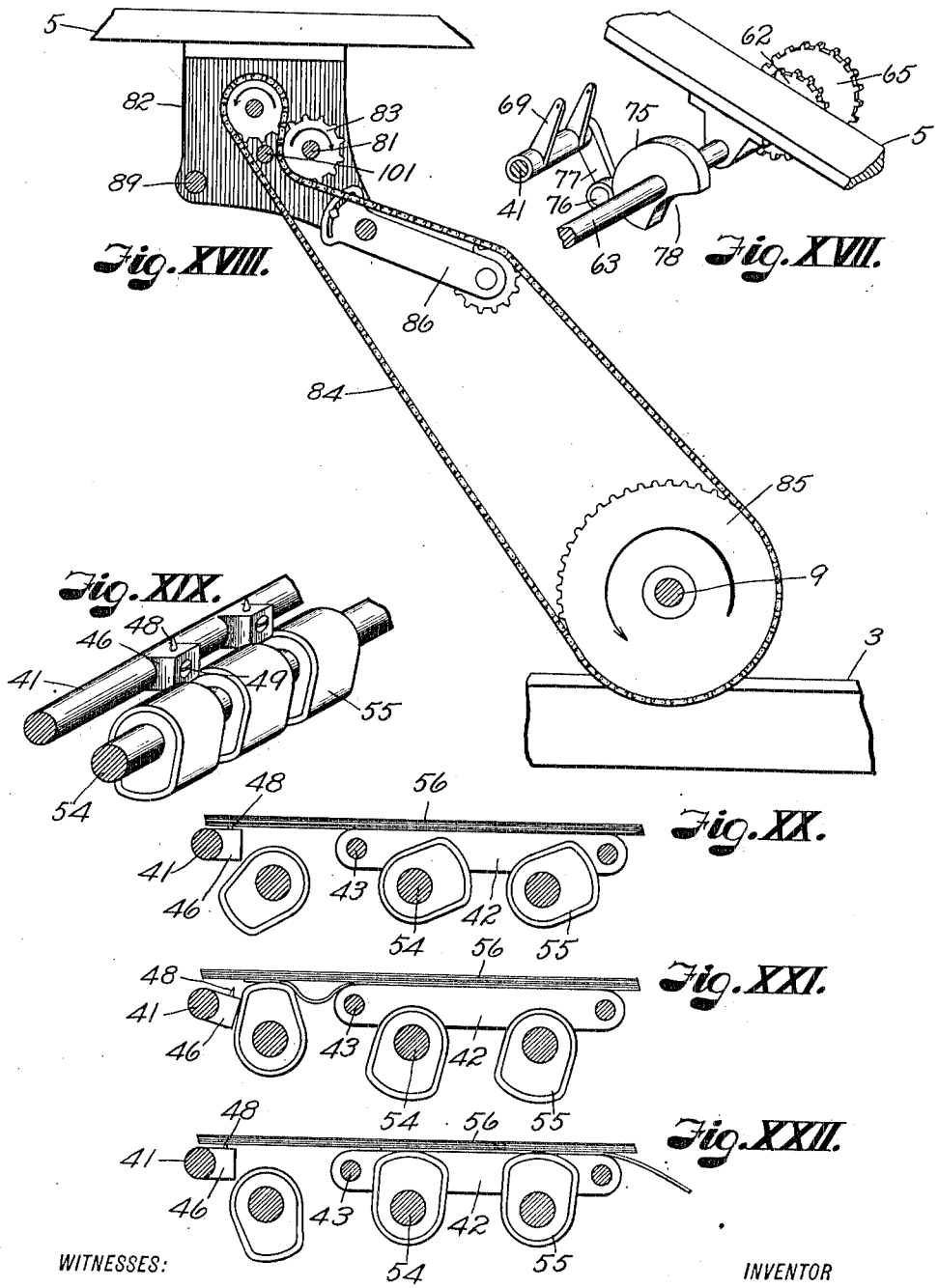
WITNESSES:
Arthur W. Caps.
Lewis L. Miller.
INVENTOR
William O. Sargent.
BY Arthur C. Brown
ATTORNEY

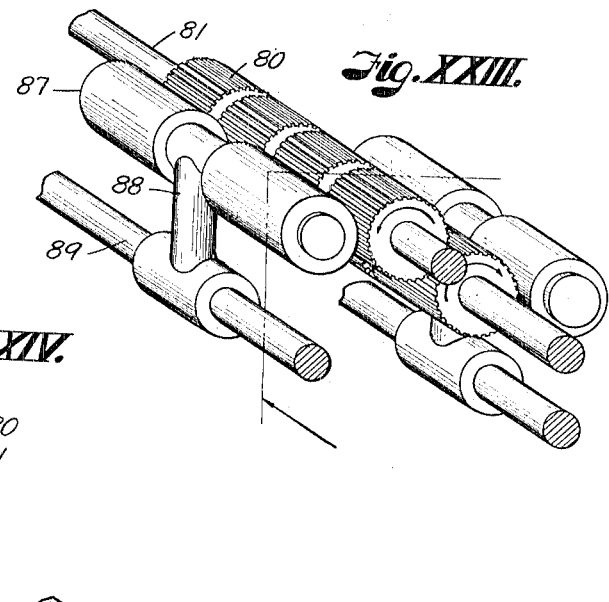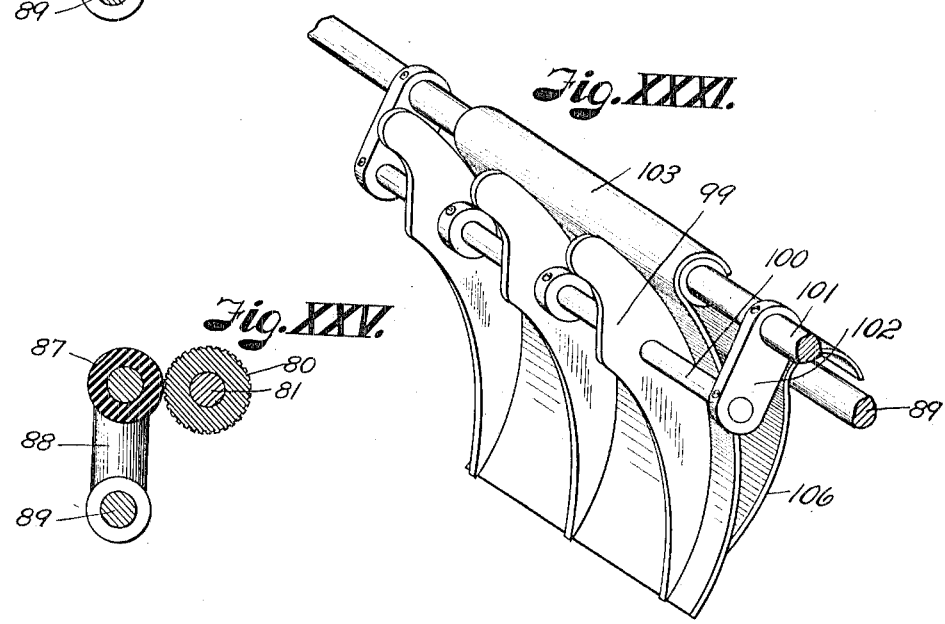

W. O. SARGENT.
SOAP WRAPPING MACHINE.
APPLICATION FILED DEC. 27, 1912.
1,099,398.
Patented June 9, 1914.
20 SHEETS—SHEET 12.
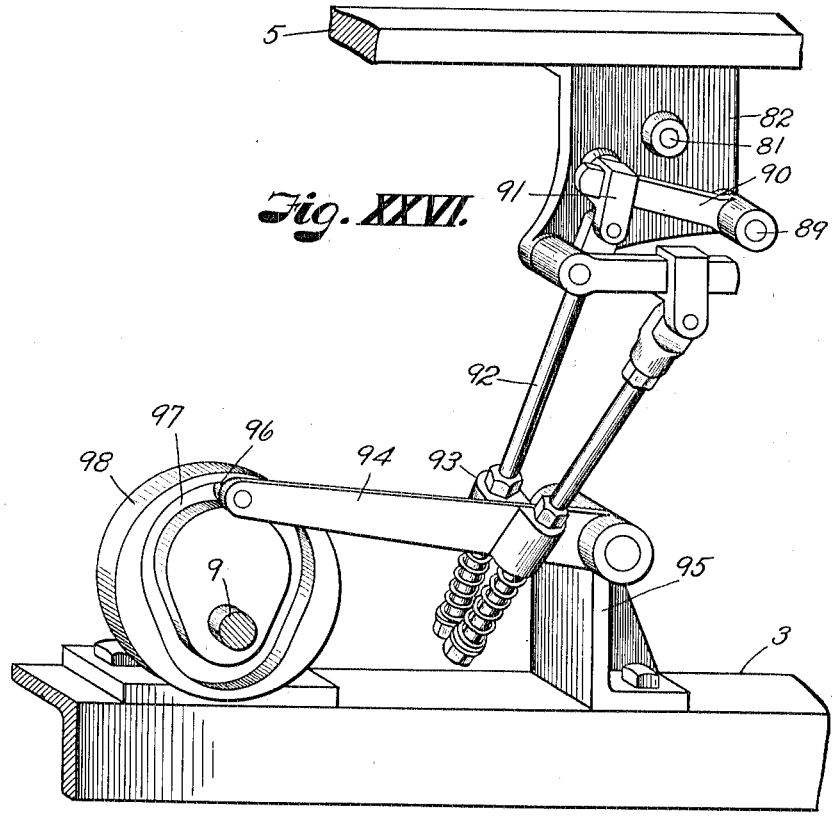
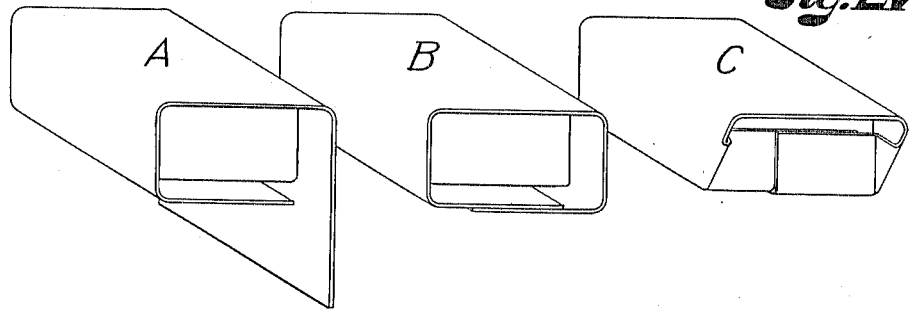
WITNESSES:
Arthur W. Capps
Lewis L. Miller
INVENTOR
William O. Sargent
BY Arthur C. Brown
ATTORNEY

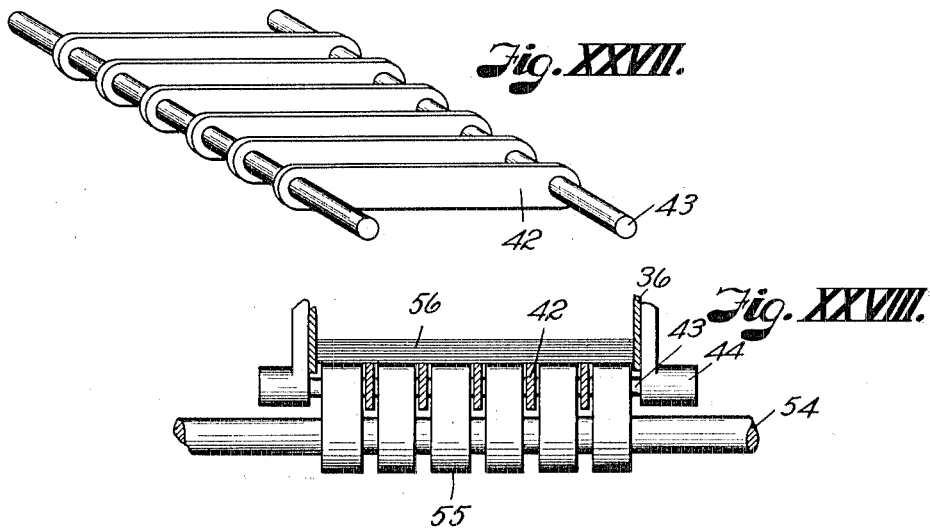
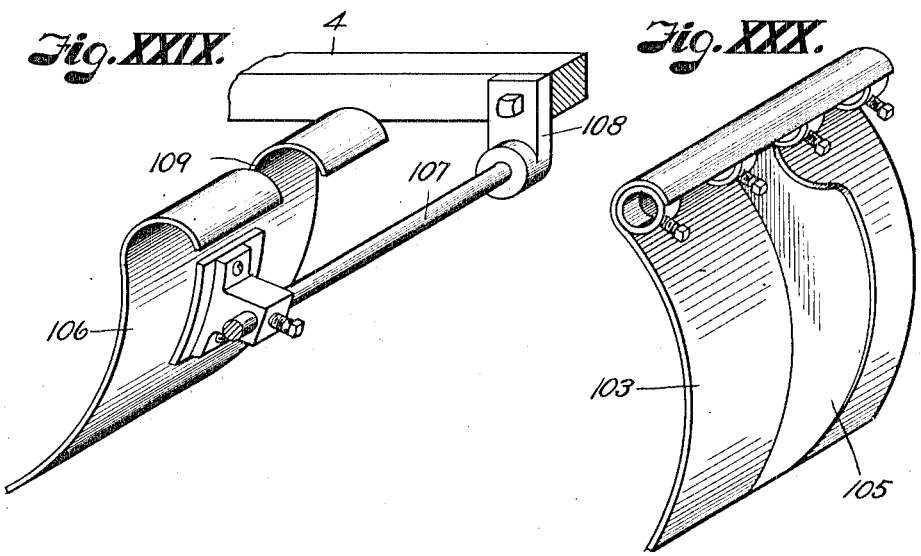

W. O. SARGENT.
SOAP WRAPPING MACHINE.
APPLICATION FILED DEC. 27, 1912.
1,099,398.
Patented June 9, 1914.
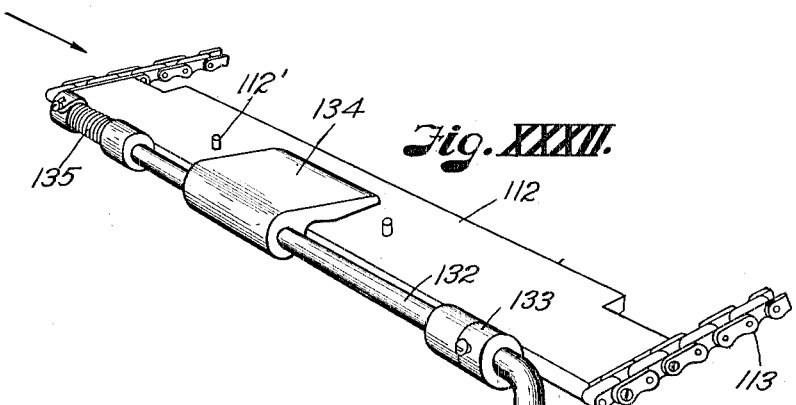
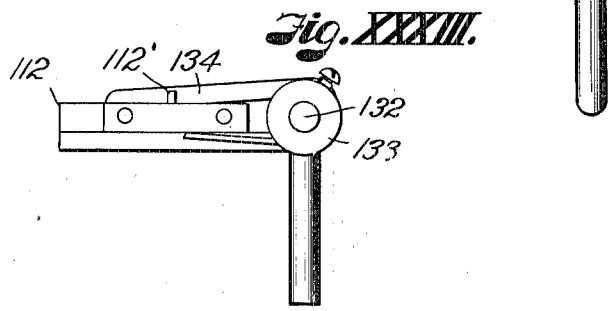
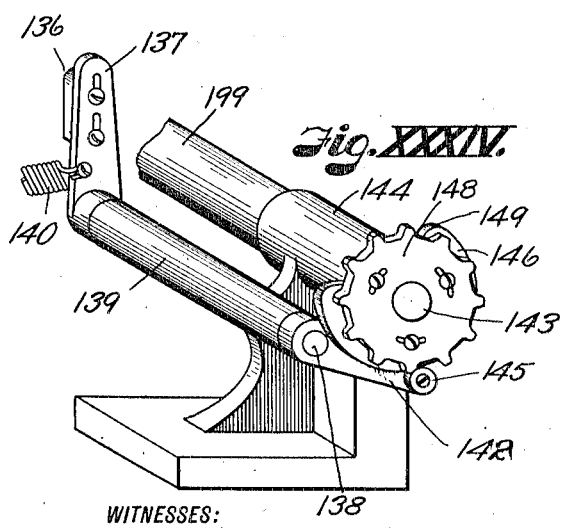
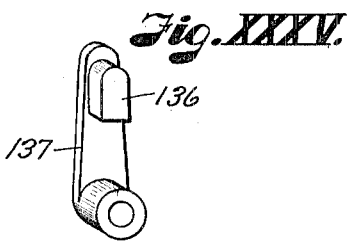
INVENTOR
William O. Sargent.

W. O. SARGENT.
SOAP WRAPPING MACHINE.
APPLICATION FILED DEC. 27, 1912.
1,099,398.
Patented June 9, 1914.
20 SHEETS—SHEET 15.
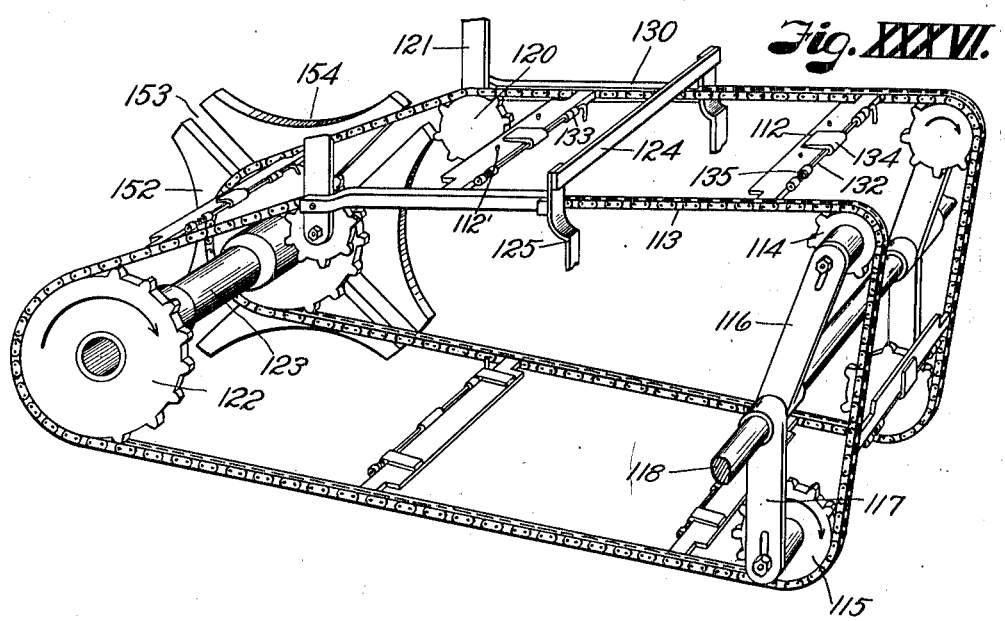
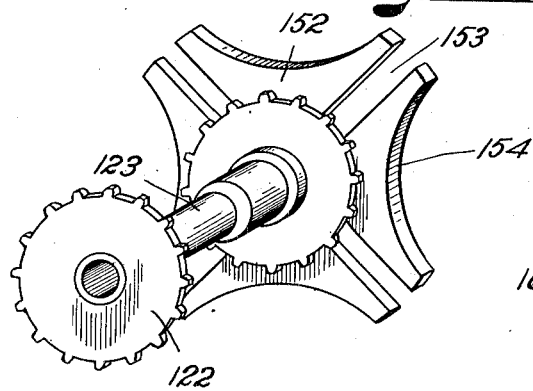
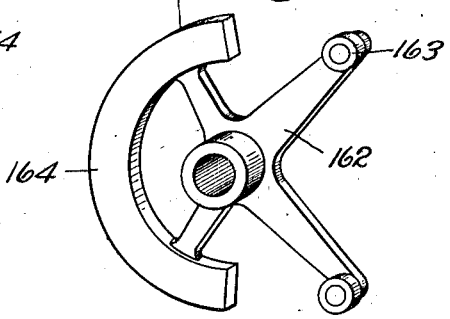
WITNESSES:
Arthur W. Capps.
Lewis L. Miller.
INVENTOR
William O. Sargent.
BY
Arthur C. Brown
ATTORNEY

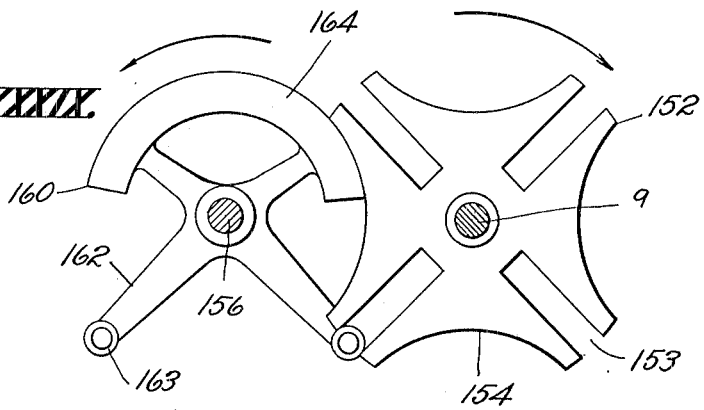
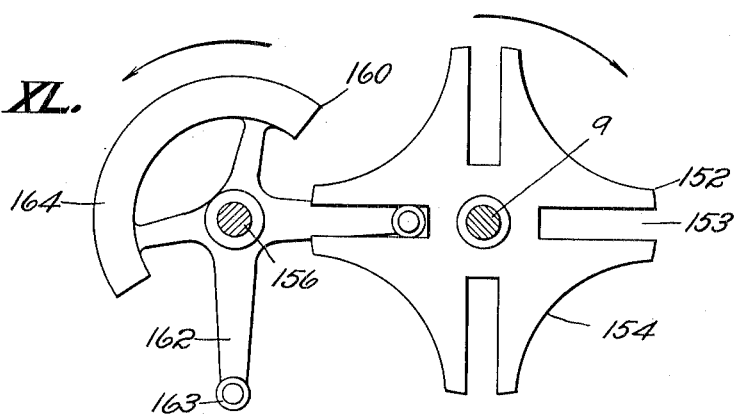
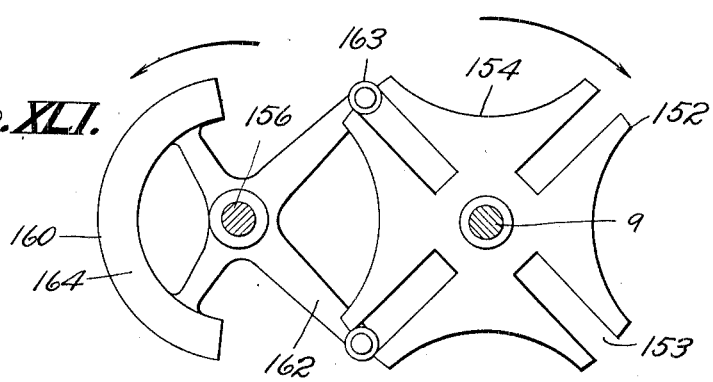

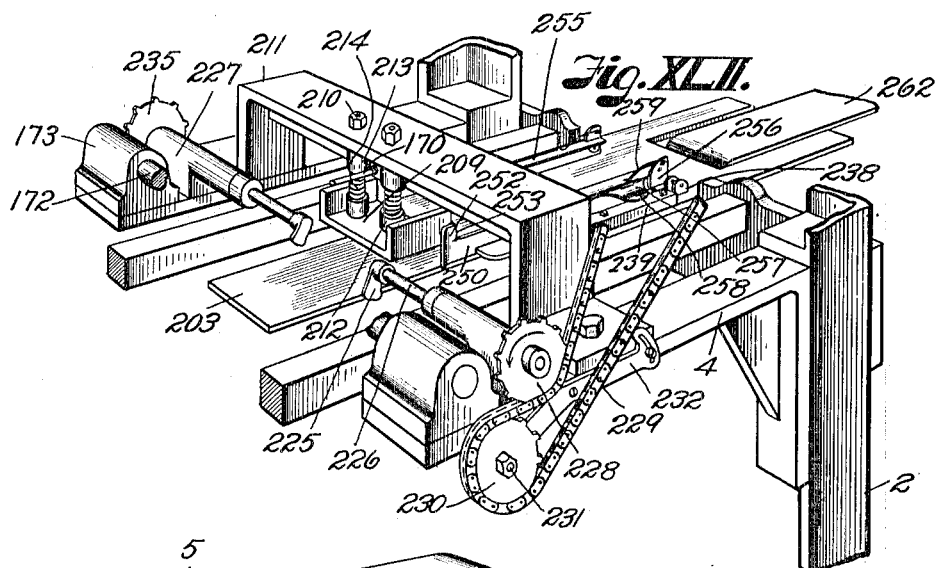
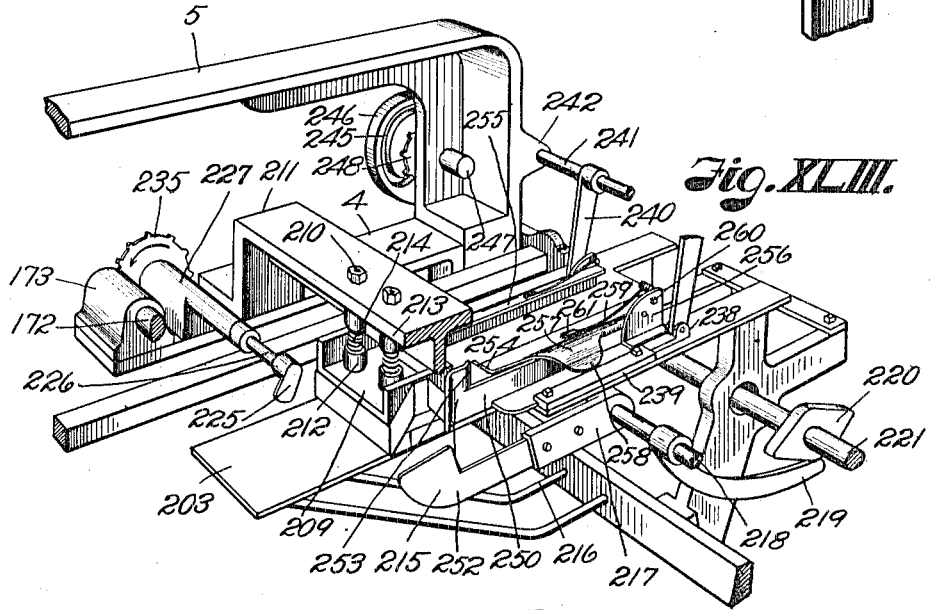
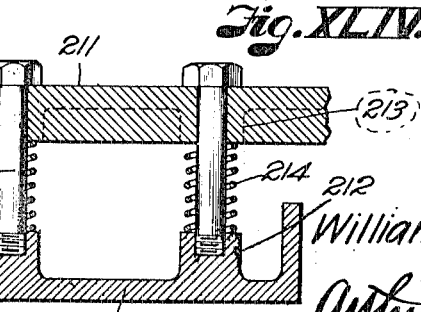

W. O. SARGENT.
SOAP WRAPPING MACHINE.
APPLICATION FILED DEC. 27, 1912.
1,099,398.
Patented June 9, 1914.
20 SHEETS—SHEET 18.
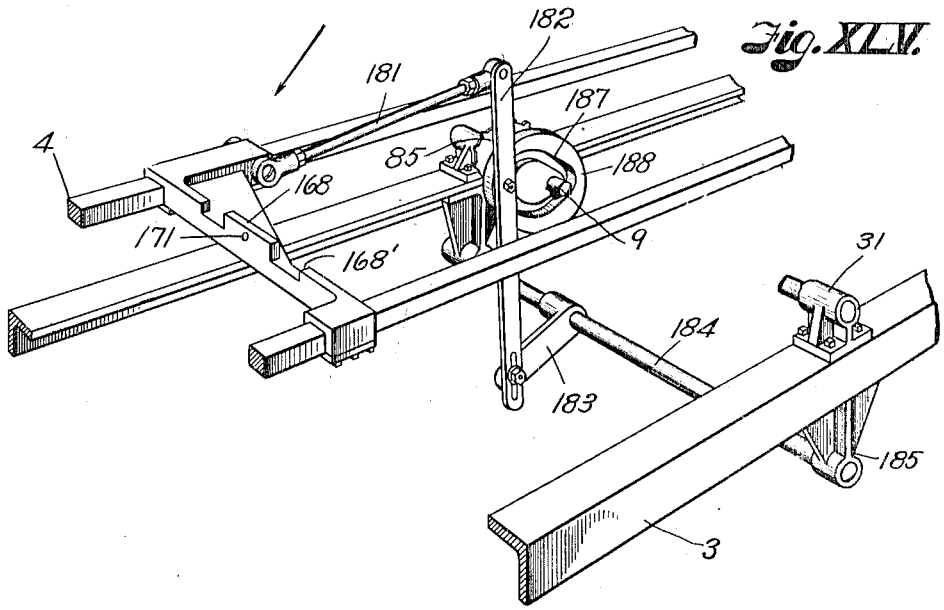
Fig. XLV.
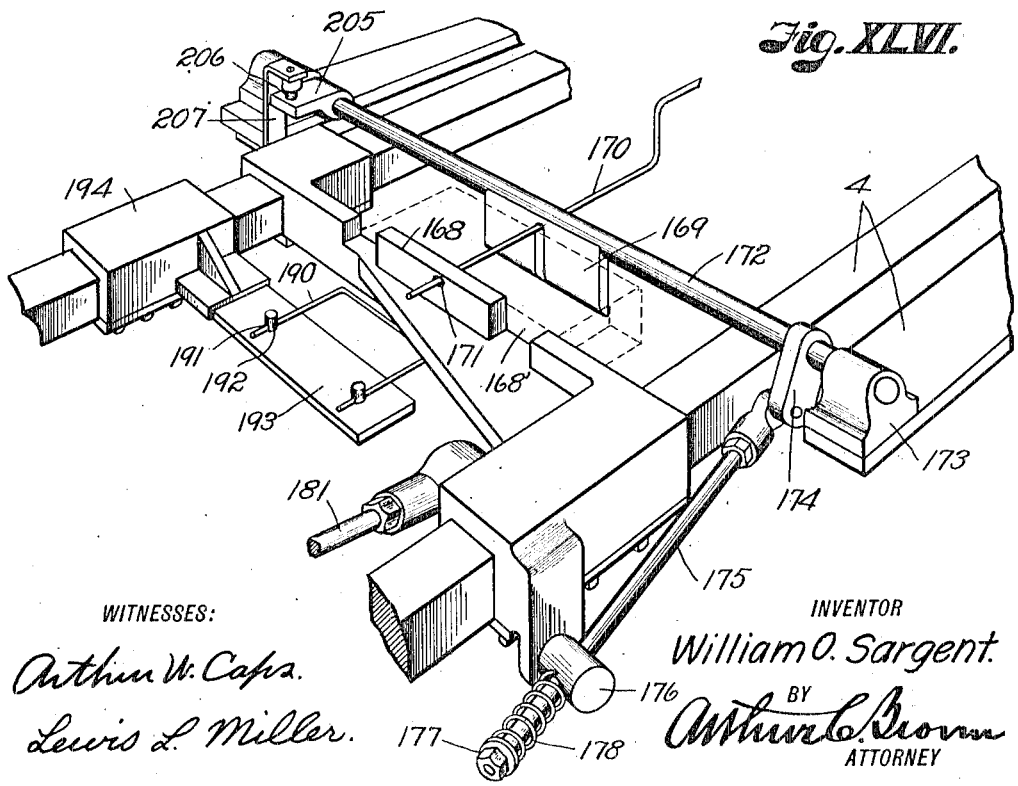
Fig. XLVI.
WITNESSES:
Arthur W. Capps.
Lewis L. Miller.
INVENTOR
William O. Sargent.
BY
Arthur C. Brown
ATTORNEY

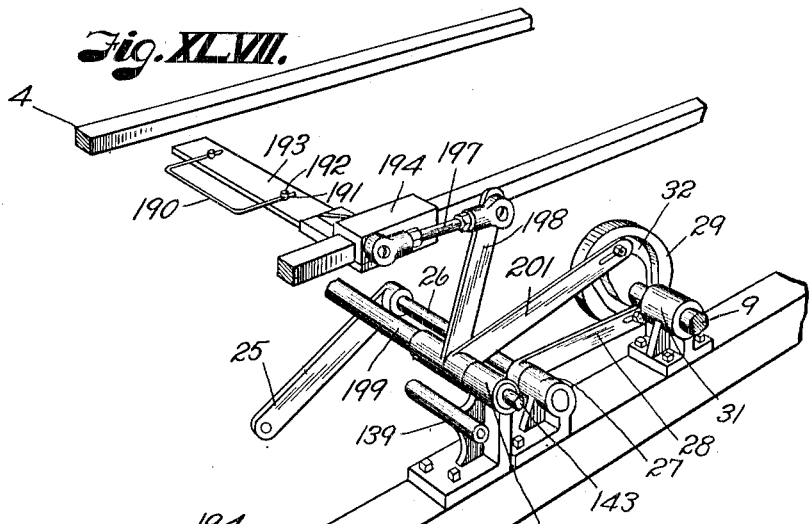
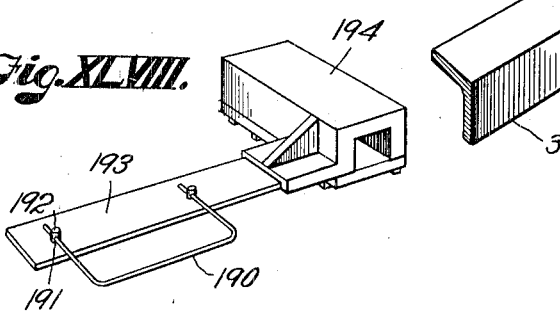
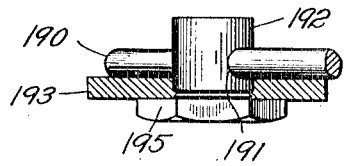
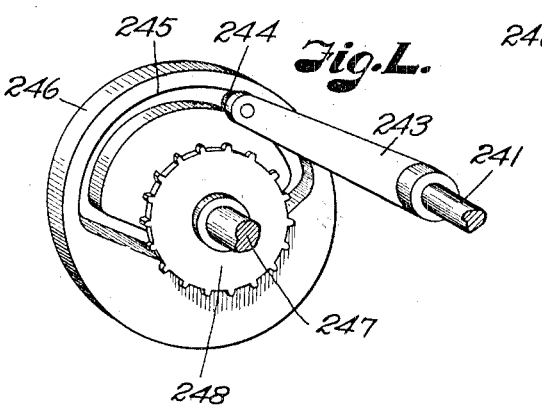
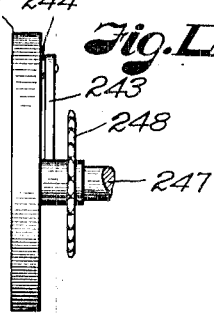

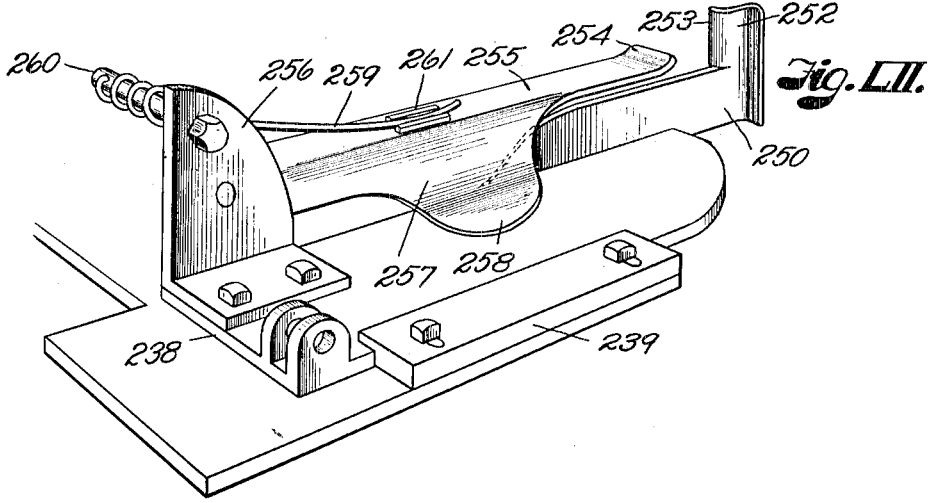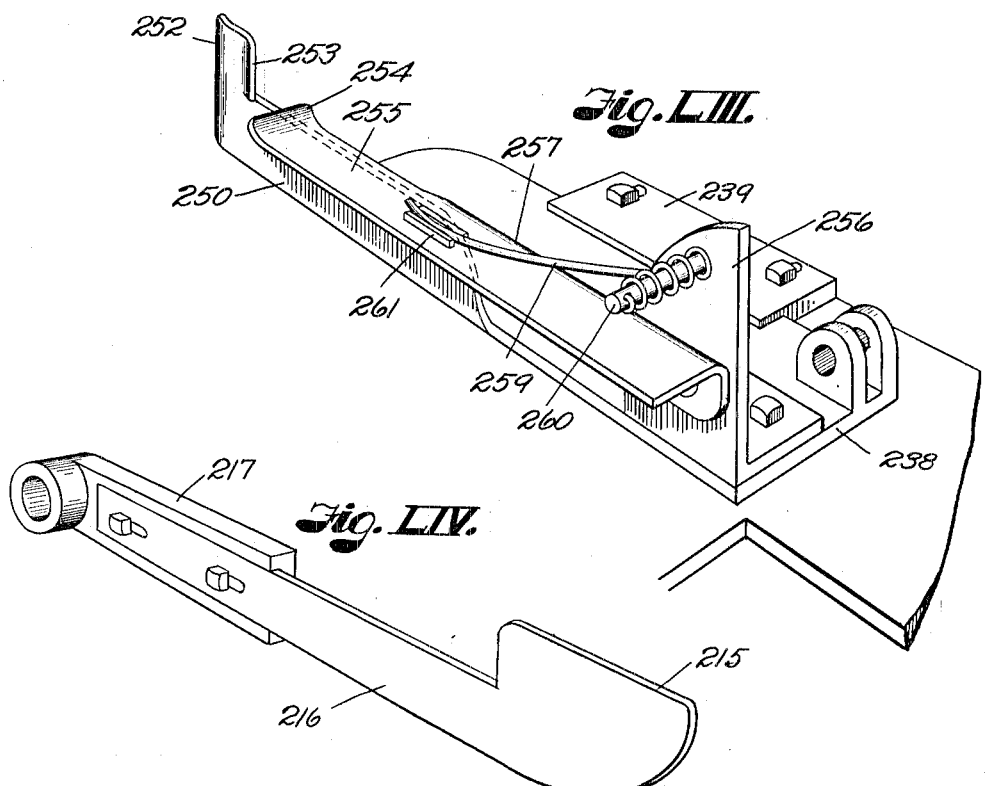

UNITED STATES PATENT OFFICE.

WILLIAM O. SARGENT, OF KANSAS CITY, KANSAS, ASSIGNOR TO PEET BROTHERS MANUFACTURING COMPANY, OF KANSAS CITY, KANSAS, A CORPORATION OF MISSOURI.

SOAP-WRAPPING MACHINE.

1,099,398.   Specification of Letters Patent.   Patented June 9, 1914.

Application filed December 27, 1912. Serial No. 738,907.

*To all whom it may concern:*

Be it known that I, WILLIAM O. SARGENT, a citizen of the United States, residing at Kansas City, in the county of Wyandotte and State of Kansas, have invented certain new and useful Improvements in Soap-Wrapping Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a soap wrapping machine, and has for its principal object to provide mechanism for enveloping cakes of soap in suitable wrappers and comprising means for feeding the soap, applying the wrappers thereto and folding the wrappers about the cakes so that they present a neat appearance when delivered from the machine. The mechanism for accomplishing this object comprises conveyers whereby the unwrapped cakes are delivered to the machine and the wrapped cakes delivered therefrom, and intermediate mechanism for feeding the cakes and wrappers into coöperative relation, together with means for folding the wrappers about the cakes during travel of the latter through the machine. The mechanism whereby this object is accomplished comprises improved details of structure, the preferred forms of which are illustrated in the accompanying drawings, wherein:—

Figure I is an elevation taken from the side of the machine into which the unwrapped cakes of soap are fed. Fig. II is an elevation of the opposite side of the machine. Fig. III is an elevation of the end of the machine from which the wrapped cakes of soap are delivered. Fig. I$^A$ is a horizontal section on the line I$^A$—I$^A$, Fig. I. Fig. III$^A$ is a vertical section on the line III$^A$—III$^A$, Fig. III. Fig. IV is an enlarged detail elevation of the main drive shaft showing the eccentric sprocket and gear wheels whereby the various parts of the machine are driven. Fig. V is a longitudinal section of same. Fig. VI is a perspective view of the transmission for operating the double wrapper feeders. Fig. VII is a perspective view of the conveyer by which the unwrapped cakes are delivered into the machine and the plunger by which the individual cakes are lifted into position for receiving the wrappers. Fig. VIII is a longitudinal section of same. Fig. IX is a perspective view of the conveyer and plunger mechanism taken from a position diagonal to that of Fig. VII. Fig. X is an enlarged cross-section of part of the plunger frame, showing the yielding rail for making the first fold of the wrappers. Fig. XI is an inverted detail perspective of the plunger. Fig. XII is an enlarged detail perspective of a part of the conveyer frame showing the plunger rod guides. Fig. XIII is an enlarged longitudinal section of the separate wrapper feeding mechanism and the assembling chute, with the gripper for withdrawing the wrappers from the chute and conducting same to the initial wrapping position. Fig. XIV is a detail perspective of the separate wrapper bins, showing the mechanism for actuating the pin clamps. Fig. XV is a detail elevation of the pin clamp levers. Fig. XVI is a detail perspective of one of the wrapper bins showing the bearings for the slatted bottom and pin clamp shafts. Fig. XVII is a detail perspective of one of the cam shafts and the lever links on the clamp shaft. Fig. XVIII is a side elevation of part of the mechanism for forwarding wrappers from the bins to the assembler. Fig. XIX is a detail perspective of a set of forwarding cams and pin clamps. Figs. XX, XXI, and XXII are elevational views illustrating the action of the forwarding cams and pin clamps. Fig. XXIII is a detail perspective of the forwarder between the wrapper bins and assembler. Fig. XXIV is a sectional detail showing a pair of corrugated and resilient rollers in inoperative relation. Fig. XXV is a similar view of the same parts in operative relation. Fig. XXVI is a perspective view of the mechanism for rocking one of the forwarding devices in each set. Fig. XXVII is a detail view of the bottom of the wrapper and bin. Fig. XXVIII is a cross-section of the lower portion of a bin showing the mode of operation of the forwarding cams. Fig. XXIX is a detail perspective of the rear guide plate in the forwarding chute, showing the slot through which the forward shank is adapted to pass. Fig. XXX is a similar view of the front plate. Fig. XXXI is a detail perspective of the chute formed by combining said plates. Fig. XXXII is a detail perspective of the gripper for taking wrappers from the assembling chute. Fig. XXXIII is an enlarged end view of the gripper. Fig. XXXIV is a detail perspective of the cam and lever mechanism for actuating the gripper. Fig. XXXV is a detail perspective of the gripper trip dog. Fig. XXXVI is a perspective view of the wrapper conveying mechanism. Fig. XXXVII is a detail perspective of the grooved member in a geneva gear mechanism for stepping the grippers. Fig. XXXVIII is a similar view of the arc and stud member of the gearing. Figs. XXXIX, XL and XLI are elevational views illustrating the action of the geneva gearing. Fig. XLII is a perspective view of the folding mechanism whereby a cake of soap is held and the ends of the wrappers folded over the ends of the cake, the fourth fold members being omitted for better illustration. Fig. XLIII is a similar view of the same parts showing a cake of soap in the clamp and illustrating the action of the folders, one of the third fold members being omitted for better illustration. Fig. XLIV is a longitudinal vertical section of the clamp illustrated in the two previous figures. Fig. XLV is a detail perspective of part of the mechanism for forwarding a cake of soap from the initial folding position and whereby a second fold is made during travel of the cake. Fig. XLVI is a reversed perspective of the same parts including illustration of a cake holding member and the second folding device. Fig. XLVII is a detail perspective of the second folding device and its operating mechanism. Fig. XLVIII is a detail perspective of the second folding device. Fig. XLIX is a detail perspective of the clamp for holding the wire in a second folding device. Fig. L is a detail perspective of the cam mechanism for actuating the second folding device. Fig. LI is a rear view of the same. Fig. LII is a detail perspective of the mechanism for making the fifth and final fold on the wrapper. Fig. LIII is a perspective view of the opposite side of same. Fig. LIV is a detail perspective of the fourth folding blade. Fig. LV illustrates the various folds on a cake of soap.

Referring more in detail to the parts: 1 designates the frame of the machine, which comprises standards 2, a lower deck 3 upon which the main driving and soap conveying mechanism is mounted, a middle deck 4 on which the second, third, fourth and fifth folding devices are mounted and from which the wrapped cakes are delivered from the machine, and an upper deck 5 which carries the separate wrapper bins.

Extending transversely across the machine and supported on the lower deck 3 is a frame 6 (Figs. I and VII to XII) one end of which has a yoke 7 within which a shaft 8' is revolubly mounted, said shaft being extended adjacent the main shaft 9 and provided with a beveled gear 8" which is adapted for meshing with a like gear wheel 9' on said drive shaft to forward the conveyer belt 11. The conveyer belt 11 is adapted for travel to carry cakes of soap to the machine and passes over a shelf 10 and over a roller 12 revolubly mounted between arms 13 of the frame 6, the said roller having its shaft projected through the side of the frame and provided with a sprocket wheel 12' over which a chain belt 12" is adapted for travel, said belt being also run over a tightening sprocket wheel 14 idly mounted on the side of the frame and over a sprocket wheel 8''' on the pulley shaft 8' whereby the conveyer is driven.

As the upper level of the conveyer 11 is preferably slightly above the upper edge of the frame arms 13, I prefer to provide guide rails 15 for retaining cakes of soap on said conveyer, said rails being supported on legs 16 attached to the sides of the frame arms. The ends of the guides are flared outwardly to provide ingress and egress mouths for the soap, and the rear legs 16 are extended above the guide rails and connected above the rear ends of the conveyer, a tongue 17 being projected forwardly over the conveyer and beneath which the cakes of soap are required to pass in order to insure their delivery in proper position onto the elevating plunger 18. The plunger 18 comprises a U-shaped body, the platform of which is adapted to rest on webs 19 in the frame 6 with its upper surface at about the level of the forward end of the conveyer, and is provided with guide rods 20 which are adapted to slide in apertures 21 in the webs 19 when the plunger is reciprocated vertically.

In order to operate the plunger, I provide same with a link 22 which is pivotally mounted on a pin 23 carried by a yoke 24 on the under face of the plunger platform, the opposite end of said link being connected with a lever 25 which is fixed on a shaft 26 (Fig. LXVII) revolubly mounted in bearings 27 on the lower deck 3 and has a lever arm 28 rigidly fixed thereon and extending past the face of the cam disk 29, which in turn is rigidly fixed on the main drive shaft 9 which is revolubly mounted in bearings 31 also mounted on the lower deck.

The lever arm 28 has a roller (not shown in detail) projecting into the cam shaft groove 32 in a disk 29 so that as the main drive shaft is revolved the plunger is raised and lowered intermittently to lift cakes of soap forwarded thereonto.

A stop member 34 is fixed on the frame 6 at the end of the plunger frame opposite the conveyer in order to stop cakes of soap in proper position for actuation by the plunger, and in coöperative relation to a mechanism for carrying the wrappers thereover, which I will now describe, with particular reference to Figs. XIII to XLI of the drawings.

As it is desirable in most cases to wrap each cake of soap in a double wrapper—an inner waxed sheet and an outer printed—I provide mechanism for carrying and feeding the double wrappers separately to an assembler, whereby they are conducted together to position for application to the cakes of soap.

Each of the bins for containing a specific kind of wrapper comprises side members 36 which are supported by rails 37 having hinged mounting on the upper deck of the frame so that the bins may be raised from the frame when desired, the sides of the bins 36 being provided with pins 39 which extend through slots 40 in the hinged rails so that the bins may be adjusted longitudinally. The bottom of each bin comprises a rear support 41 and a forward slatted support 42, which latter is mounted on cross-rods 43 journaled in bearings 44 suspended from the sides of the bins (Fig. XVI), the shaft of the rear pin clamp being journaled in bearings 45 on the sides of the bin and having an eccentric portion 46 extending through the bin and provided with apertures 47 within which the pins 48 are held in position by set screws 49. The bin is open at the rear but has a forward gate 50 pivotally mounted on a shaft 51 journaled in the sides of the frame, the lower end of the gate being curved forwardly and projected below the slatted bottom of the bin.

Journaled in bearings 53 which are suspended from the upper deck 5 are shafts 54 which extend below the bottom of the bin and are spaced longitudinally along its length, two of the shafts being located beneath the slatted bottom and one in the same plane with the other two but between the end of the bottom and the pin shaft.

Fixed on each of the shafts 54 are a number of cams 55 which are adapted for engaging the lower wrapper in a stack 56 carried within the bin and for forwarding said lower wrapper from beneath the stack, the cams on the two forward shafts being arranged similarly so that they will act in unison in forwarding the wrapper, but the cams on the rear shaft being arranged substantially oppositely to the forward cams so that the wrapper is first actuated by the rear cams to remove its rear edge from the rear support in the bin and out of the reach of the pin clamp prior to the forwarding action of the two front cams, the independent operation of the rear cams forming a downward bulge in the rear portion of the wrapper until the wrapper is finally forwarded by the two front cams.

The mechanism for actuating the cams comprises sprocket wheels 58 (Figs. II and VI) on the ends of the shafts 54, along which a chain belt 59 is adapted for travel to actuate all of the shafts in unison, the belt being passed beneath the sprocket wheels for one bin and over the sprocket wheels for the opposite bin so that the actuation in separate bins will be opposite in order to feed the wrappers in said bins toward each other. The belt 59 runs over a spacing sprocket 60 carried by a bracket 61 on the upper deck and over a drive sprocket 62 (Fig. III) on the shaft 63 which is also journaled in bearings carried by the upper deck, said shaft receiving its power from a chain belt 64 which runs over a sprocket wheel 65 on said shaft 63 and over a sprocket wheel 66 on the main drive shaft 9, the belt 59 being held to the sprocket wheels 58 by rails 67 which are mounted on the upper deck.

In order to hold the stack of wrappers in the bin while the bottom wrapper is being forwarded by the cams, I provide the pin clamp heretofore described, and to operate the eccentric shaft on which the pins are mounted I provide said shaft with a crank 69 (Fig. XIV) which is pivotally mounted on the shaft connected with a double lever 70 pivotally mounted on an extension of the rod 51 which carries the front of the wrapper bin, the opposite end of said lever 70 having rigid connection with a crank 71 on the clamp shaft 72 of the opposite bin.

If both of the cranks 69—71 were rigidly connected with their pin shafts, the shafts would be actuated in unison, but no provision would be made for adjusting either of the clamp shafts independently of the other. In order to obviate this disadvantage I provide the shaft 51 with a crank 73 which is rigidly connected with the lever 70 and also with the shaft 41, and with this construction pivot the crank 69 on said shaft. With this arrangement when the links 74, which connect the cranks 69 and 71 with the double arm lever, are adjustable, adjustment of either bin may be secured without affecting the other.

In order to actuate the pin clamp levers, I provide the shaft 63, which carries the sprocket wheel over which the cam shaft driving chain is run, with a cam 75 which is adapted for engaging a roller 76 on a crank arm 77 that is rigidly connected with the crank 69 on the pin shaft 41, the cam 75 having a pocket 78 for receiving the roller when the pin shaft lever mechanism is rocked under tension of the spring 79, which is preferably connected with the link 74 of the crank arm 71 and with an extension of the rod on which the front member of the second wrapper bin is mounted. The parts are so arranged that when the pin clamp lever mechanism is actuated, to move the pins away from the stack of wrappers, the rear cam 55 will engage the bottom wrapper in the stack and forward same to cause the bulge between the rear and front cams, the pin clamp returning to active position before the rear clamp has left its contact with the bottom wrapper and prior to the forwarding travel of the forwarding cams, so that the points of the pins would engage the bottom of the stack to hold same against the forwarding tension of the forward cams.

When the forward cams move the wrappers toward the front of the bin, the forward edges of said wrappers engage the inclined lower ends of the front members of the bins and are turned downwardly into contact with corrugated rollers 80, which are fixed on shafts 81 that are journaled in bracket plates 82 that depend from the upper deck of the main frame. Each of said shafts has a sprocket wheel 83 fixed thereon over which a chain belt 84 is adapted to travel in a manner to cause the sprocket wheels and corrugated rollers to revolve in opposite directions, the chain belt being run over a sprocket wheel 85 on the main drive shaft 9 and over a belt tightener 86 which is preferably mounted on the bracket plates 82, the corrugated rollers revolve in opposite directions and are adapted for turning the forward ends of the wrappers down into the assembly chute, but in order to assure positive feed of the wrappers to the chute, I provide pressure rolls adapted for holding the wrappers against the rollers and preferably comprising rubber or like jacketed members 87 having central shank members 88 fixed on cross shafts 89, the ends of which project through one of the bracket plates 82. Fixed on the end of each of said shafts 89 is a lever 90 having a head 91 adjustably mounted thereon and pivotally connected with a pitman 92, the lower end of which projects through an aperture in a boss 92 on a lever 94 pivotally mounted in a bracket 95 on the lower deck and provided with a roller 96 which projects into the groove 97 in the side of a cam disk 98 that is fixed on the main drive shaft 9 and is adapted for actuating the lever to rock said rolls 87 toward or from their corrugated forwarding rollers.

It is apparent that when the forward ends of the wrappers are moved into engagement with and held against the corrugated rollers, and the rollers are revolved that they will be drawn out of the bins and forwarded into the chute.

In order to properly assemble the separate wrappers, I provide an assembly chute, preferably comprising curved blades 99 which are adjustably mounted on a shaft 100, suspended from a cross-rod 101 by links 102.

103 designates a canopy which is fixed on cross-rod 101 and extends along but in spaced relation to said blades, so that wrappers delivered from the rear bin are conducted between the blades and canopy to the lower end of the assembler.

The front face of the canopy has a rib 105 provided with a curved front face which lies adjacent to a canopy 106 carried by a shaft 107 that is mounted in brackets 108 on the middle deck and lies close to but in spaced relation to the front edge of the rib so that wrappers delivered from the rear bin are carried between the rib and canopy to the lower end of the assembler where they are to meet the front wrapper, the upper end of the rear canopy having a slot 109 through which the shank of the rear forwarding roll 87 is adapted to project when the roll is brought into contact with the corrugated roller.

The lower ends of the inner and outer wrappers delivered from the front and rear bins respectively are delivered over one of a number of grippers which are carried beneath the assembler and are adapted for conducting the assembled wrappers over a cake of soap carried on the plunger 18 prior to the elevation of the plunger.

Each gripper comprises a plate 112 which is fixed at its ends to the chain belts 113 which run over guide sprocket wheels 114 and 115 on arms 116 and 117 which extend upwardly and downwardly respectively over a rod 118 that is carried in brackets 119 (Fig. 1) on the lower deck, said sprocket wheels being adjustable in order that the belts may be tightened when necessary. Said belts also run over said sprocket wheels 120 revolubly mounted in pendant brackets 121 carried by the middle deck and also over sprocket wheels 122 on a sleeve 123 which is revolubly mounted on the main drive shaft 9, both of the belts being run beneath guide rail 124 carried by brackets 125 that are rigidly mounted on the plunger frame 6 and a rail 126 carried by brackets 127 which are hingedly mounted on said frame and yieldingly tensioned toward the frame by springs 128 which surround pins 129 that extend loosely through apertures in said brackets, the ends of the springs bearing against the brackets and heads on said pins in order to yieldingly tension the brackets toward the frame and hold the rail 126 in operative relation to the rail 124. Just before passing beneath the rails 124—126 the chain belts pass through guides 130 which are carried by the brackets 125 and pendant brackets 119 respectively, so that the grippers which are carried by the chains are held steady and in position for receiving the wrappers.

The loose member of each gripper comprises a rod 132 (Fig. XXXII) which is pivotally mounted in bearings 133 on the rear edge of the bar 112, and has a lip 134 projected rearwardly over the top of the plate, a spring 135 being fixed to the rod and one of the bearings in order to yieldingly tension the lip against the bar. One end of the bar 132 is turned downwardly at right angles to engage a trip boss 136 which is adjustably mounted on a standard 137 carried by a shaft 138 which is revolubly mounted in a bearing 139 on the lower deck 3 and tensioned in the direction of travel of the keeper belts by a spring 140 which is connected with the standard and with the plunger frame so that an arm 142 on said shaft is yieldingly tensioned toward a shaft 143 that is journaled in bearings 144 on said lower deck, and a roller 145 carried by said arm held in yielding engagement with a cam 146 on the shaft 143. The shaft 143 also has rigidly mounted thereon a sprocket wheel 148 which is engaged by the belt 64 so that a point 149 in the cam 146 is brought into position over the roller on the arm 142 at proper intervals to allow the trip boss 136 to engage the pendant crank portion of the gripper rod when the gripper has come to rest directly in front of the mouth of the assembler chute. It is apparent that with the parts in this position when the wrappers are dropped through the chute they will pass beneath the gripper bar 112 and rib 134 which is held open by the trip heretofore described, the bar being provided with pins 112' for stopping the wrappers in proper position so that when the gripper is moved forwardly and released from the trip boss the lip may close the ends of the wrappers and hold same so that they are carried over the plunger with the travel of the gripper.

In order to properly step the gripper mechanism relative to the travel of other parts, I provide a form of Geneva gearing comprising a grooved member 152 which is fixed on the sleeve 123 and has right-angled grooves 153 and arcuatile sockets 154 in its periphery between the grooved positions.

Revolubly mounted in bearings 155 adjacent the main shaft is a cross shaft 156 having a gear wheel 157 meshing with a gear wheel 158 on the main shaft and having an arc and arm member 160 arranged in alinement with the groove and socket member on the sleeve, the arms 162 on said member having rollers 163 adapted for projection into the grooves 153 to forward the grooved member when the driving member is actuated, and having an arc 164 adapted to travel through the peripheral sockets 154 when the collar is to remain at rest in order to hold the parts against accidental movement. It is apparent that by proper adjustment of this mechanism the gripper may be forwarded at regular intervals relative to the travel of the other parts, so that each gripper member may be stopped in position for receiving the wrappers when the latter are released, as heretofore described.

The wrappers are carried over the plunger as the plunger rises with a cake of soap thereon so that the wrappers are interposed between the soap and the rails 124 and 126. As the rails 124 and 126 are spaced to allow a close clearance of the cake of soap therebetween when the plunger pushes the wrappers between the rails the wrappers are folded over the edges of the cake to produce the initial or top fold. After the cake has passed between the rails 126 and 124 it is carried between a horizontal plunger 168 and a yielding plate 169 so that when the vertical plunger returns to its lower position the cake of soap is held in elevation, a rod 170 being extended between the plate 169 and plunger 168 to stop the cake at the proper elevation, the rod being slidably extended through an aperture 171 in the plunger so that the latter may travel horizontally, as will presently be described.

The plate 169 depends from a rod 172 which is revolubly mounted in bearings 173 on the middle deck, and has a crank member 174 pivotally connected with a link 175 which is slidably extended through a boss 176 on the plunger 168, the projected end of the link having a head 177 and a spring 178 surrounding the portion of the link between the head and boss to yieldingly tension the link rearwardly.

The plunger 168 is slidably mounted on the deck beams 4 so that it may slide to or from the shaft 172, the sliding travel being produced by a pitman 181 which is pivotally connected with a lever 182 having adjustable connection with a crank 183 on a shaft 184 that is revolubly mounted in brackets 185 suspended from the lower deck 3.

On lever 182, between the link 181 and crank 183, is a roller which projects into the groove 187 of a cam disk 188 which is rigidly fixed on the main drive shaft 9, so that as the shaft revolves the plunger is reciprocated horizontally at proper intervals relative to the operation of the other parts.

After the cake of soap has been projected between the plunger 168 and plate 169, with the ends of the wrappers hanging over the sides of the cake, and before the plunger 168 starts to move forwardly with the soap carried between same and the plate 168, the second folding device operates to push the rear ends of the wrappers beneath the cake to make the edge and bottom fold, this folder comprising a U-shaped wire 190, the closed part of which is adapted for projection beneath the plunger 168 and the arms of which extend through apertures 191 in studs 192 which are carried by and project upwardly above the face of a bar 193 carried by a bracket 194 that is slidably mounted on one of the middle deck beams, the arms of the U-shaped folder being held in place by friction thereof against the top of the bar 193, the friction being induced by drawing the studs 192 downwardly through threaded connection with nuts 195 (Fig. XLIX) which are carried on the lower ends of the studs and bear against the bottom face of the bar.

The slide bracket 194 is actuated by a pitman 197 which is pivotally connected with the bracket and with a lever 198 which is fixed on a shaft 199 revolubly mounted in bearings 200 on the lower deck 3, the shaft in turn being actuated by a lever 201 having a roller (not shown) projected into the groove 32 of the cam 29 whereby the lever 25, which lifts the vertical plunger, is actuated.

The plunger 168 has its lower edge in a plane slightly higher than that of a table 203, and the parts are so arranged that after the soap has been placed between the plunger 168 and its plate, and the folding member 190 advances to move the rear ends of the wrappers beneath the cake of soap, the folding device and plunger are moved forwardly together and the cake of soap pushed over the edge of the table 203, thereby folding the front ends of the wrappers beneath the cake of soap and over the rear ends, as illustrated at "B" Fig. LV, the boss 176 sliding over the shaft 175 and a shaft revolving under pressure of the advancing cake of soap to allow the plate 169 to turn and allow the cake of soap to pass thereunder. When the plunger has returned, the boss 176 engages the spring 178 and rolls the rod 175 backwardly to reset the plate, the back travel of the rod and its shaft being limited by the engagement of a lip 205 on said shaft with a stop 206 on a bracket 207 carried by the lower deck.

As the cake of soap is moved onto the table 203 it is forced under a clamp block 209 carried by studs 210 which are slidably mounted in an inverted U-shaped cross frame 211 that is carried by the middle deck 4, the clamp block and bracket having collars 212 and 213 respectively within which the ends of coil springs 214 that surround the studs 210 are seated, the arrangement being such that the cake of soap will lift the clamp block sufficiently to force a seat thereunder and be held by the block while the succeeding folding operations are being performed. When the cake of soap is properly seated beneath the block, folding blades 215 are raised against the lower edges of the wrappers to fold the lower end portions of the wrappers over the ends of the cake, as illustrated at "C," Fig. LV, the blades 215 being mounted on arms 216 carried by shanks 217 on a shaft 218 having a wiper 219 for actuation by a diamond-shaped cam 220 on a shaft 221 which is revolubly mounted in bearings at the rear of the machine frame and is actuated by a sprocket wheel 222 that is engaged by the chain belt 64, so that the folding blades are lifted at regular intervals and in proper relation to the operation of the other parts.

After the folding blades have been raised and lowered, the front edges of the wrapper are folded inwardly over the ends by dogs 225 which are carried by stub shafts 226 revolubly mounted in bearings 227 at the sides of the middle deck, one of which is provided with sprocket wheel 228 which is driven from a chain belt 229 that runs over a sprocket wheel 230 on a stub shaft 231 carried by a bracket 232 on the side of the middle deck, the belt receiving its power from a sprocket wheel 233 on the shaft 63 which is driven from the main chain belt 64, the other dog shaft being provided with a sprocket wheel 235 which engages the main chain belt 64, the belt being run under the sprocket wheel and having a tightening pulley 236 located adjacent thereto on an adjustable bracket 237 which is carried on the middle deck.

The dogs are located at opposite sides of the table 203 so that they will not interfere with the travel of the soap over the table, and in line with recesses 168', in the plunger 168 so as not to interfere with the travel of said plunger, the arrangement of the dogs and their driving gears being such that the dogs are revolved after the operation of the folding blades and prior to the removal of the soap from beneath the spring block.

With the wrappers folded as described, a gripping folder moves forwardly over the rear end edges of the cake to fold these edges of the wrappers, such device comprising paired slide members 238 which are adapted for travel on the middle deck and under guides 239 adjustably mounted on the deck, the actuation of the slides being effected through levers 240 which are rigidly connected with a shaft 241 revolubly mounted in bearings 242 on the main frame and provided with a link 243 having a roller 244 projected into the groove 245 of a cam disk 246 which is revolubly mounted on a stub shaft 247 projected from the side of the machine frame, said shaft 247 having a sprocket wheel 248 rigidly mounted thereon and over which the main chain belt 64 travels, so that the slides are reciprocated in proper sequence with the other parts.

Each slide has an arm 250 extending forwardly therefrom and provided with an inturned yieldable lip 252 which is adapted for pushing the rear ends of the wrappers over the ends of the spring block 209 as this folder is moved forwardly.

When the arms 250 have folded the wrapper, as described, on-coming cakes of soap force the forward cake from beneath the spring block and along the arms 200, the inturned portion 253 of the lips 252 turning the ends of the wrappers against the horizontal, upwardly flared lips 254 on arms 255 which are pivotally mounted on standards 256 on the slides 238.

The arms 250 are cut away in front of the standards 256 and the arms 255 have downwardly turned ears 257 extending downwardly over the cutaway portion and having downwardly flared tips 258 engaging the slide base 238, the pivoted arms being yieldingly tensioned downwardly by springs 259 which are mounted on studs 260 on the standards 256 and bear against the horizontal portions of the arms 255, battens 261 being provided for holding the springs loosely on the arms without interfering with the sliding contact thereof.

As the cakes of soap are forced backwardly between the arms 250, the ends of the flaps are directed against the horizontal portions of the arms 255 and the loose ends of the wrappers folded outwardly and along the upper edges of the arms 250 until they reach the downturned ears 257, whereby they are folded against the ends of the cake. The cakes are successively moved outwardly between the folder, just described, by incoming cakes until they reach a conveyer belt 262 which runs over a suitable pulley in table 203, when the cakes are moved onto said conveyer and carried from the machine.

In using the machine, presuming all of the parts to be constructed and assembled as described, with the driving gearing adjusted to operate the various parts in proper relation to each other, the wrapper bins are filled with wrappers and cakes of soap placed on the feeding conveyer, so that they are delivered at proper intervals into the machine.

With the parts in operation, cakes of soap are carried from the conveyer onto the elevating plunger and raised against a pair of assembled wrappers which have been carried beneath the initial folding bars as heretofore described. As the cake is pushed between the bars it lifts the wrappers so that they are folded over the edges of the cake and are carried with it to the gripping plunger which is located above the folding rails. The elevating plunger is then lowered, leaving the cake, with the wrapper hanging over its edges, within the gripping plunger. The initial bottom folder then travels forwardly to fold the rear edge of the wrappers beneath the key, all of the parts then traveling forwardly to deposit the cake on the folding table and simultaneously fold the forward edges of the wrappers beneath the cake and over the rear edges by the engagement of the rear edge of the table with the wrappers during such forwarding travel. The end folds are then made by the mechanism provided for that purpose, the construction and operation of which has been described in detail, so that all of the folds are made in successive steps as the cake of soap is traveling through the machine.

It is apparent that the folding operations take place in rapid sequence so that a great number of cakes of soap may be wrapped in a very short time.

Having thus described my invention, what I claim as new therein and desire to secure by Letters-Patent, is:

1. In a wrapping machine, a horizontal sub-frame having spaced arms and apertured webs located between the arms, a U-shaped plunger having an upper platform and legs depending over said webs, guide rods fixed to the platform and adapted for vertical sliding travel in the web apertures, a link pivotally connected with the plunger platform, a conveyer adapted for delivering articles onto the plunger, means for carrying wrappers over the plunger, and means for actuating the plunger link.

2. In a wrapping machine, a horizontal sub-frame, a plunger adapted for vertical reciprocation in said frame, a conveyer adapted for travel in the frame and for delivery onto the plunger, guide rails carried by the frame at the sides of and above the conveyer, a guide yoke located over the inner end of the conveyer, and having a spring lip projected forwardly thereover, means for carrying wrappers over the plunger, and folding mechanism into which articles are lifted by vertical reciprocation of the plunger.

3. In a wrapping machine, a carrying frame, a plunger adapted for vertical travel in the frame, brackets hingedly connected with the frame and provided with apertures, pins mounted on the frame and projected through said apertures, springs on said pins, for yieldingly tensioning the brackets toward the frame, a rail mounted on said brackets, and a stationary rail mounted on the brackets and spaced from the first named rail, for the purpose set forth.

4. In a wrapping machine, a plunger, guides adjacent the plunger, wrapper delivery mechanism, a carrier comprising spaced belts adapted for travel adjacent the delivery mechanism through said guides and in proximity to the plunger, bars carried by and extending between the belts, lips pivotally mounted on and yieldingly tensioned toward the bars, means for intermittently forwarding the belts and allowing same to come to rest adjacent the delivery mechanism and plunger, and a trip member adapted for rocking the lips after the latter come to rest adjacent the delivery mechanism and for releasing said lips at the next actuation of the carrier.

5. In a wrapping machine, conveying and folding mechanism, a main drive shaft, transmission between the main drive shaft and the conveying and folding mechanism, a sleeve revolubly mounted on the main drive shaft, sprocket wheels fixed on said sleeve, a wrapper delivery device, belts adapted for travel adjacent the delivery device and over said sprocket wheels, grippers carried by said belts and adapted for receiving wrappers from the delivery device, a transmission member fixed on said sleeve, and a transmission member operable from the main drive shaft and adapted for coöperation with the member on said sleeve for intermittently actuating the sleeve and forwarding said belts.

6. In a wrapping machine, a forwarding plunger, folding rails, a wrapper carrier, a feeding plunger adapted for pushing an article against a wrapper held by the carrier and between the folding rails to remove said article from the carrier and fold same over the edges of said article, a stop for limiting the projection of said article into the forwarding plunger, a slide, an arm carried by the slide and adapted for folding the free end of the wrapper against the article, a table, and means for simultaneously actuacting the forwarding plunger and slide to forward the article onto said table whereby the edge of the table engages the opposite free end of the wrapper to fold same against the article and over the previously folded end of the wrapper.

7. In a wrapping machine, a table, means for advancing an article to the table and for applying a wrapper thereto during its forwarding travel, blades adapted for folding the end portions of said wrapper over the ends of the article while the latter is on the table, dogs adapted for folding other end portions of said wrapper against the article while the latter is on the table, and a reciprocatory member adapted for actuation oppositely to the dogs to perform a succeeding folding operation and for conducting said articles along the table.

8. In a wrapping machine, a table, means for advancing an article to the table and for applying a wrapper thereto during its forwarding travel, blades adapted for folding the end portions of said wrapper over the ends of the article while the latter is on the table, dogs adapted for folding other end portions of said wrapper against the article while the latter is on the table, a reciprocatory member adapted for actuation oppositely to the dogs to perform a succeeding folding operation and for conducting said article along the table, and a turning device adapted for completing the end folders while the article is traveling along the table.

9. In a wrapping machine, a horizontal table, means for delivering a partially wrapped article onto the table, blades adapted for vertical movement over the ends of the article to fold the bottom end portions of the wrapper thereagainst, dogs adapted for revolution against the rear end portions of the wrapper to fold same against the article, a reciprocatory carriage having arms adapted for impingement against the forward end portions of the wrapper to fold same against the article, and turning blades adapted for folding the free ends of the wrapper against the ends of the article while the latter is traveling over the table.

10. In a wrapping machine, the combination with a revoluble shaft having a plate thereon, of a relatively fixed member having a bearing face, an apertured boss on the relatively fixed member, a crank on the shaft, a link connected with said crank and slidably extended through said boss, and whereby said shaft is turned upon actuation of said relatively fixed member, a spring engaging the link and boss to normally urge the plate to operative position relative to the fixed member, and means for moving said relatively fixed member toward and from the plate.

11. In a wrapping machine, the combination with a revoluble shaft, having a plate mounted thereon and provided with a vertical slot, of a plunger slidably mounted adjacent the plate and provided with an aperture, a rod extended through the slot and aperture, means for yieldingly urging the shaft to retain the plate in receiving relation to the plunger, means for delivering an article between the plate and the plunger, and means for reciprocating said plunger.

12. In a wrapping machine, the combination with a deck, of a plunger slidably mounted on said deck, a member adapted for coöperation with the plunger to receive and hold an article to be wrapped, a bracket slidably mounted on the deck, a bar on said bracket, a folder mounted on said bar and adapted for projection beneath the plunger, and separate means for reciprocating the plunger and bracket.

13. In a wrapping machine, the combination with a reciprocatory plunger, of means adapted for coöperation with the plunger to hold an article therebetween, a link connected with the plunger, a cam shaft, a cam on said shaft operatively connected with said link, a reciprocatory bracket, a folder on the bracket adapted for projection beneath an article supported by the plunger and its coöperating member, a link connected with said bracket, a separate cam shaft, a cam on said last named shaft operatively connected with the bracket link, and means for actuating said cam shafts, whereby the bracket is first actuated to move the folder and the bracket and plunger finally actuated to forward an article from the plunger and its coöperating member.

14. In a wrapping machine, the combination with a forwarding mechanism, of a table, a clamp-block yieldingly suspended above the table, means for forcing an article between the table and block, a normally idle shaft, blades fixed on said shaft and adapted for movement across the edges of said table and over the ends of the article supported thereon, a cam shaft adjacent the normally idle shaft, a cam on the cam shaft, and a wiper on the idle shaft adapted for actuation by said cam to rock the idle shaft and the blades, for the purpose set forth.

15. In a wrapping machine, the combination with a table, of spaced slides mounted adjacent the table, and each having a forwardly directed flange arm on its inner edge provided with a lipped free end, standards on the slide back of the flange, arms pivotally mounted on said standards and overhanging the flange arms, studs on said standards, springs on said studs having free ends overlying the overhanging arms and yieldingly tensioning the same toward the flange arms, and means for reciprocating said slides.

In testimony whereof I affix my signature in presence of two witnesses.

WILLIAM O. SARGENT.

Witnesses:
NELLIE M. PRATER,
N. NORMAN DALTON.